Feb. 10, 1931.            R. H. FENN            1,791,960
                        AUTOMATIC BOX MACHINE
                    Filed Oct. 31, 1925       14 Sheets-Sheet 1
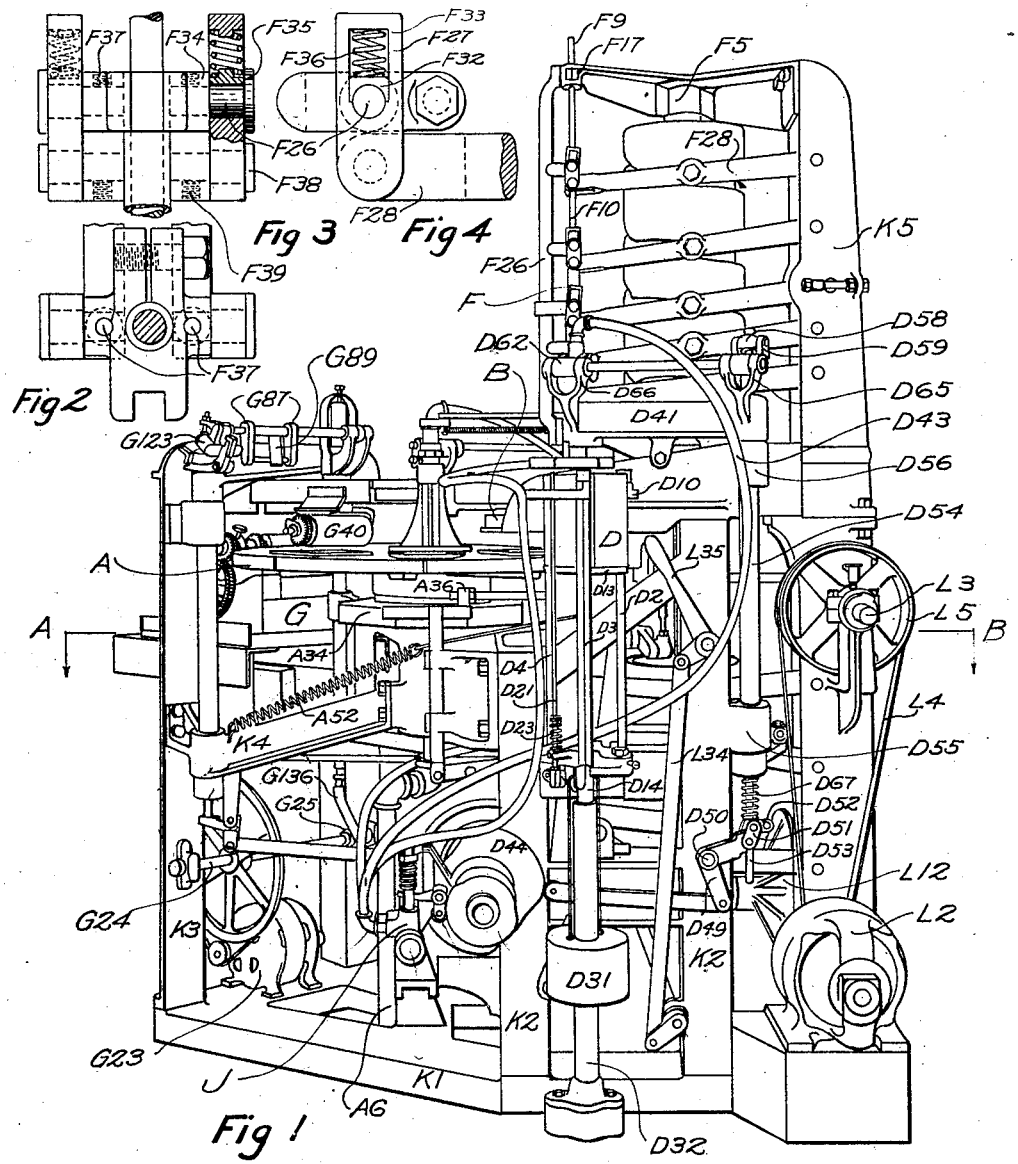
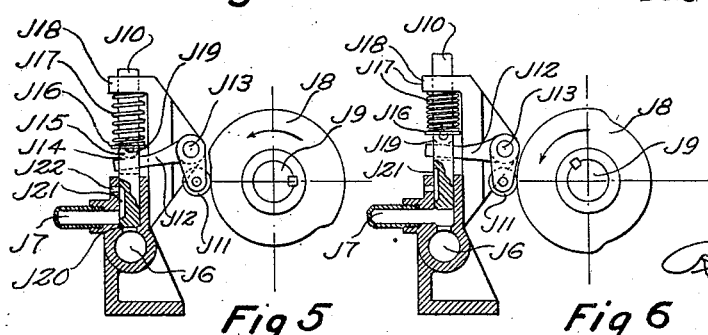
INVENTOR
Robert H. Fenn

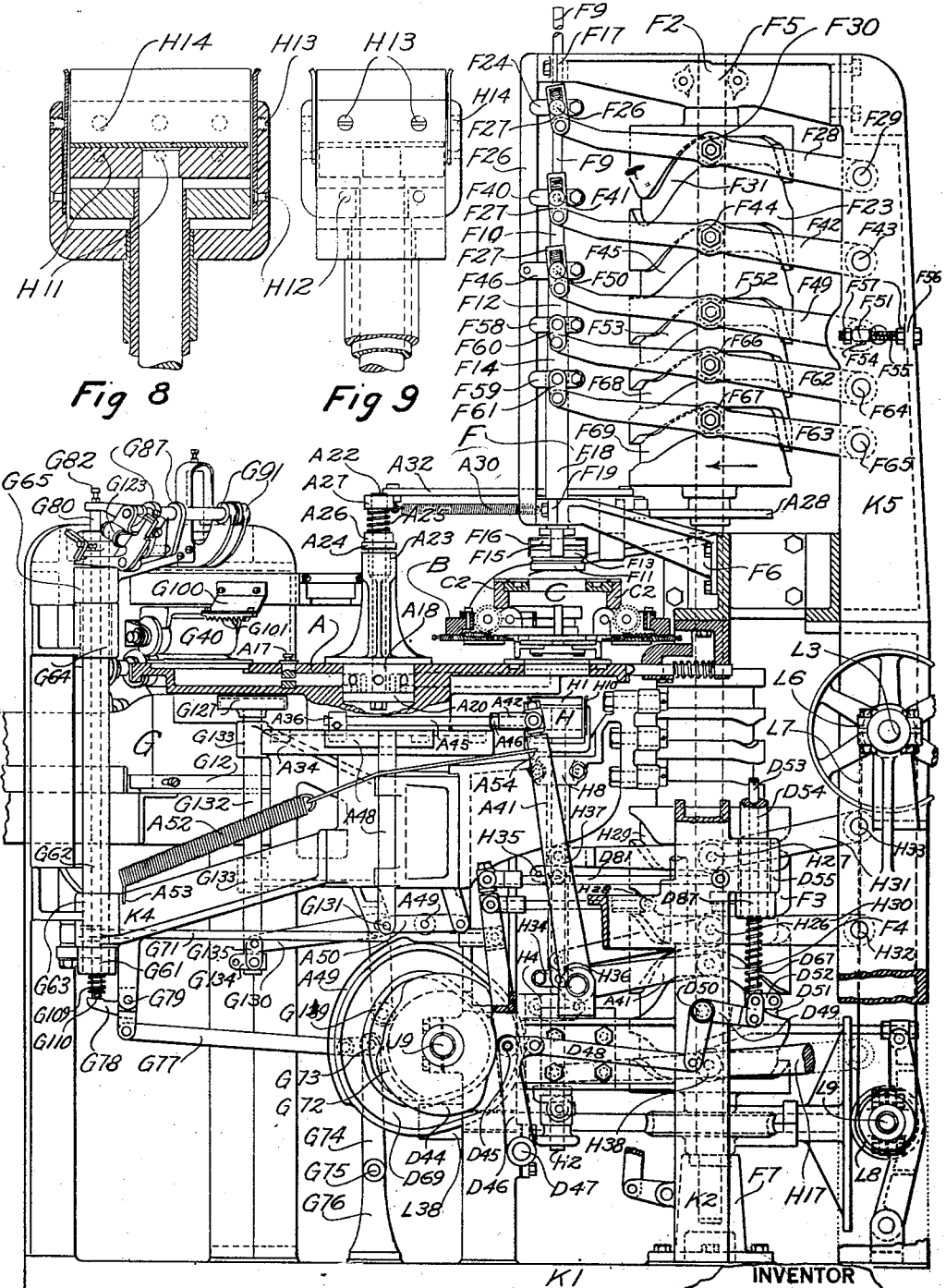

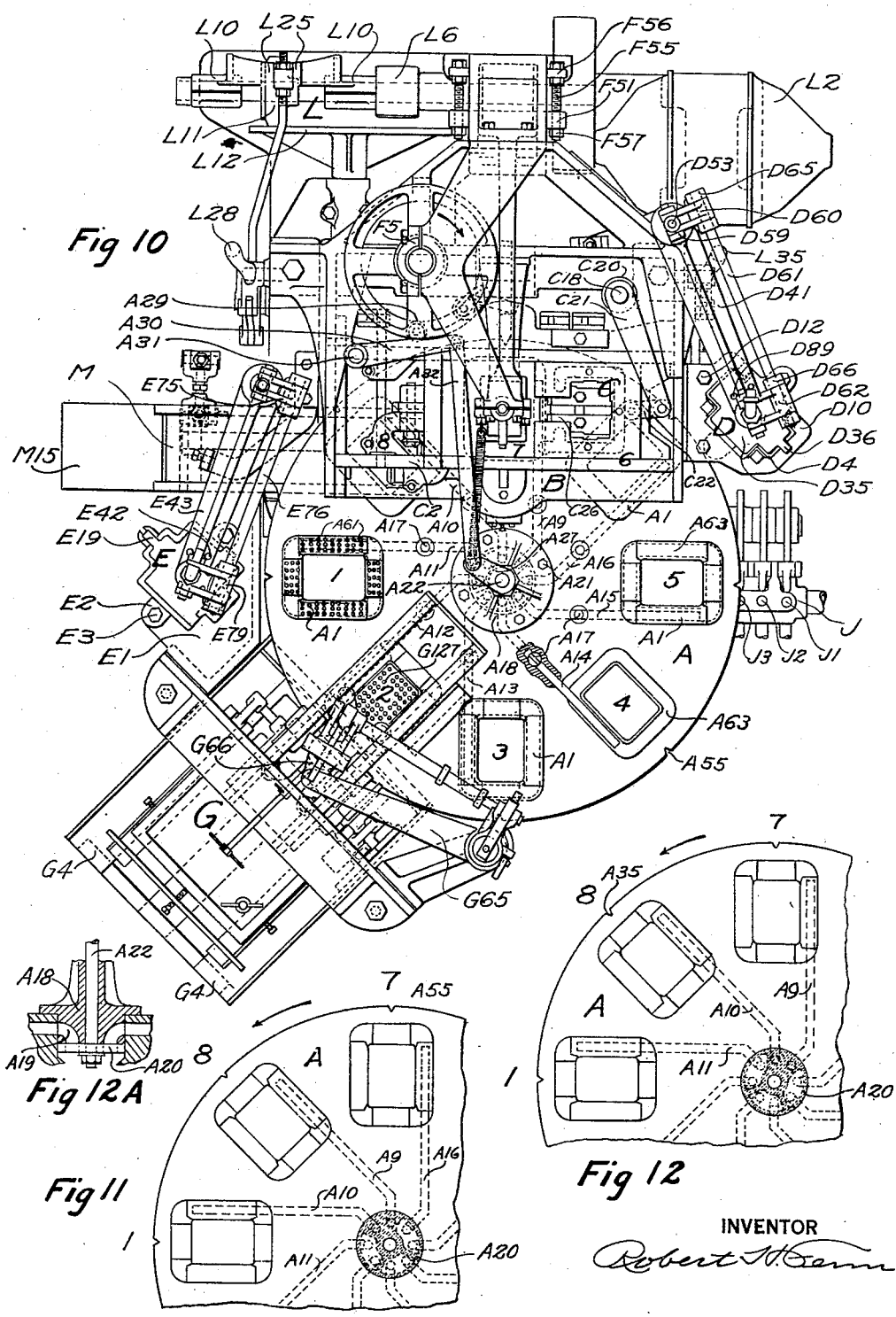

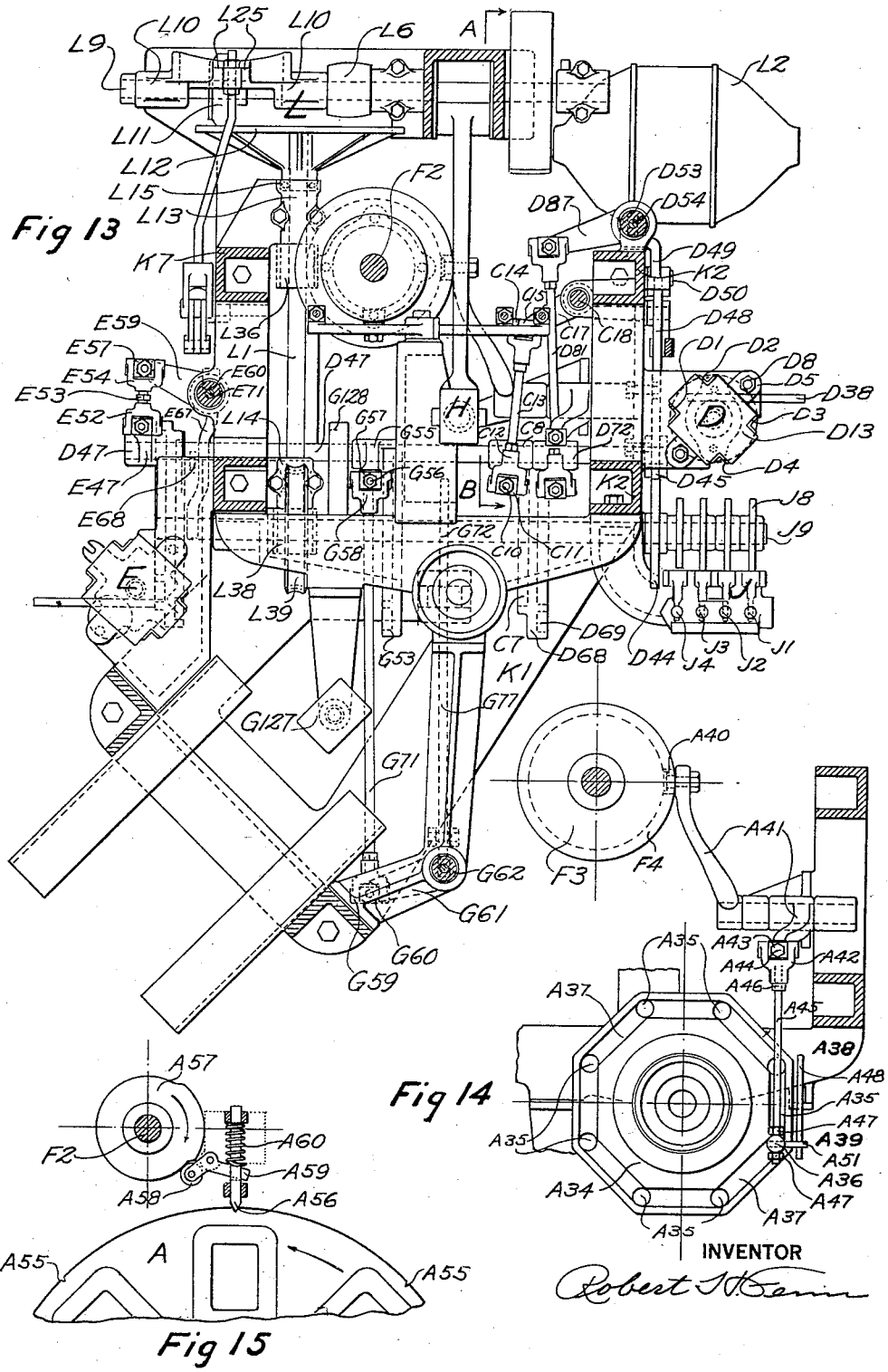

Feb. 10, 1931.   R. H. FENN   1,791,960
AUTOMATIC BOX MACHINE
Filed Oct. 31, 1925   14 Sheets-Sheet 6
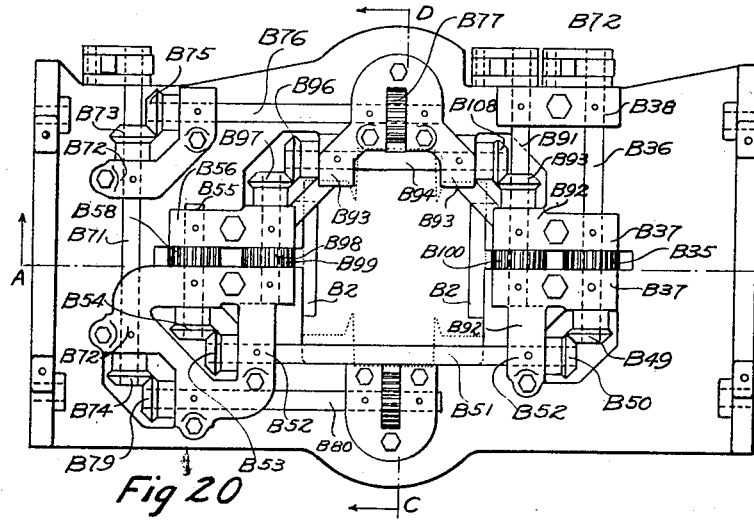
Fig 20
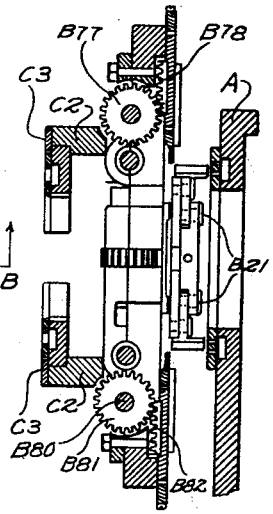
Fig 23
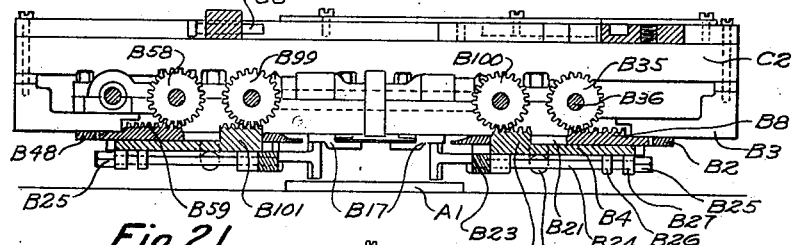
Fig 21
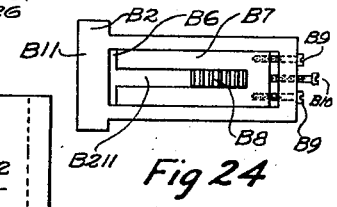
Fig 24
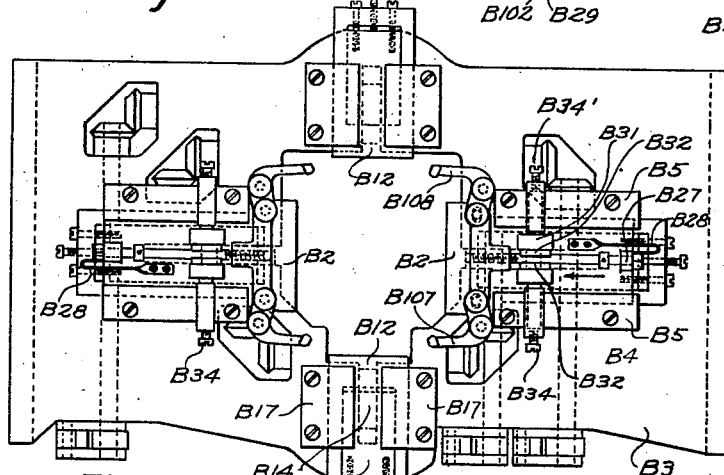
Fig 22
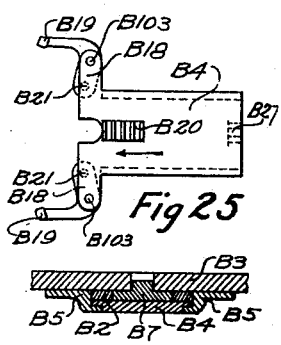
Fig 25
Fig 27A
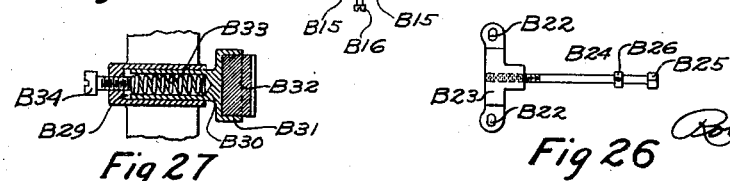
Fig 27   Fig 26
INVENTOR
Robert H. Fenn Feb. 10, 1931.   R. H. FENN   1,791,960
AUTOMATIC BOX MACHINE
Filed Oct. 31, 1925   14 Sheets-Sheet 8

INVENTOR
Robert H. Fenn

Feb. 10, 1931.    R. H. FENN    1,791,960
AUTOMATIC BOX MACHINE
Filed Oct. 31, 1925    14 Sheets-Sheet 9

INVENTOR
Robert H. Fenn.

Feb. 10, 1931.  R. H. FENN  1,791,960
AUTOMATIC BOX MACHINE
Filed Oct. 31, 1925  14 Sheets-Sheet 10
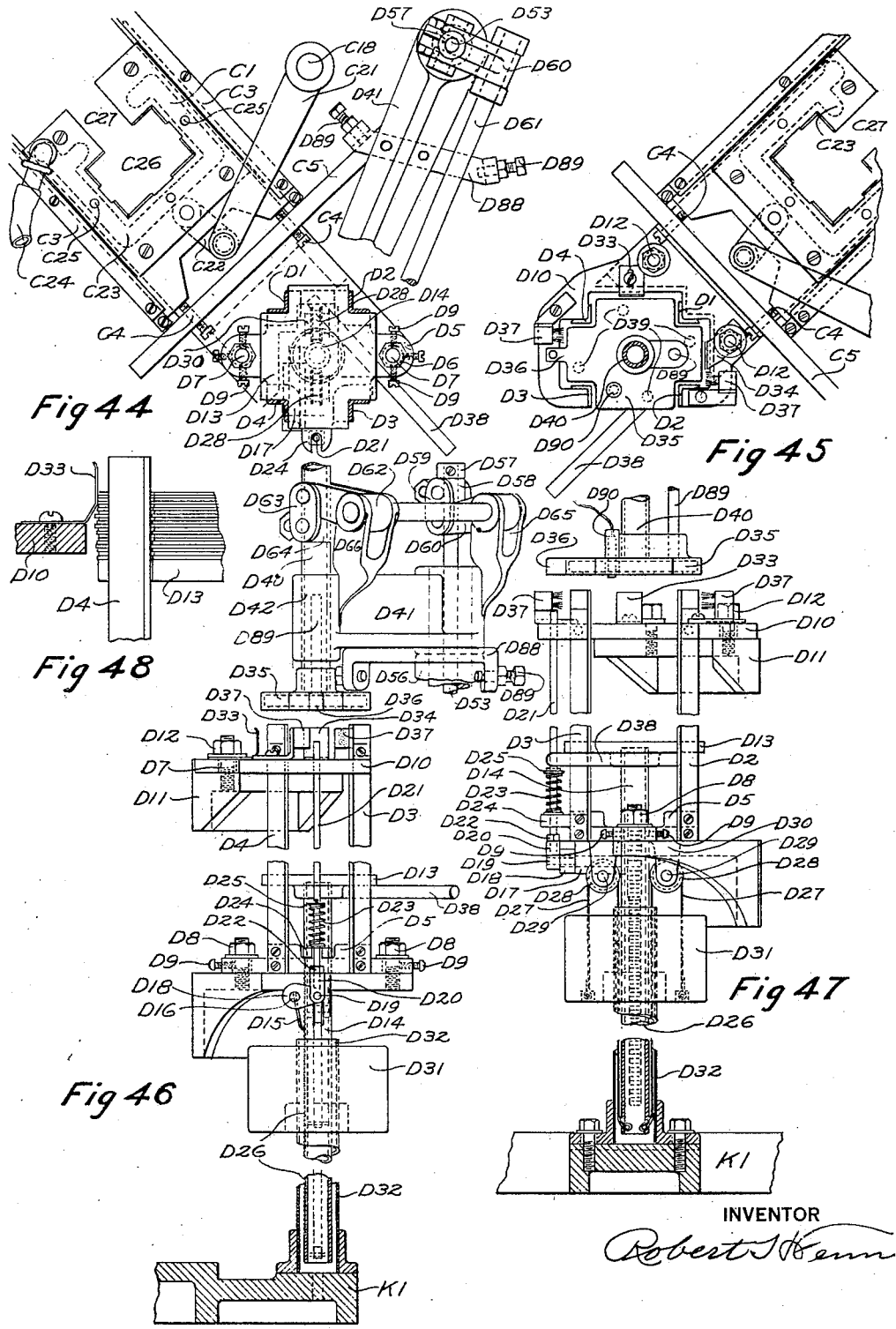
INVENTOR
Robert H Fenn Feb. 10, 1931.    R. H. FENN    1,791,960
AUTOMATIC BOX MACHINE
Filed Oct. 31, 1925    14 Sheets-Sheet 11
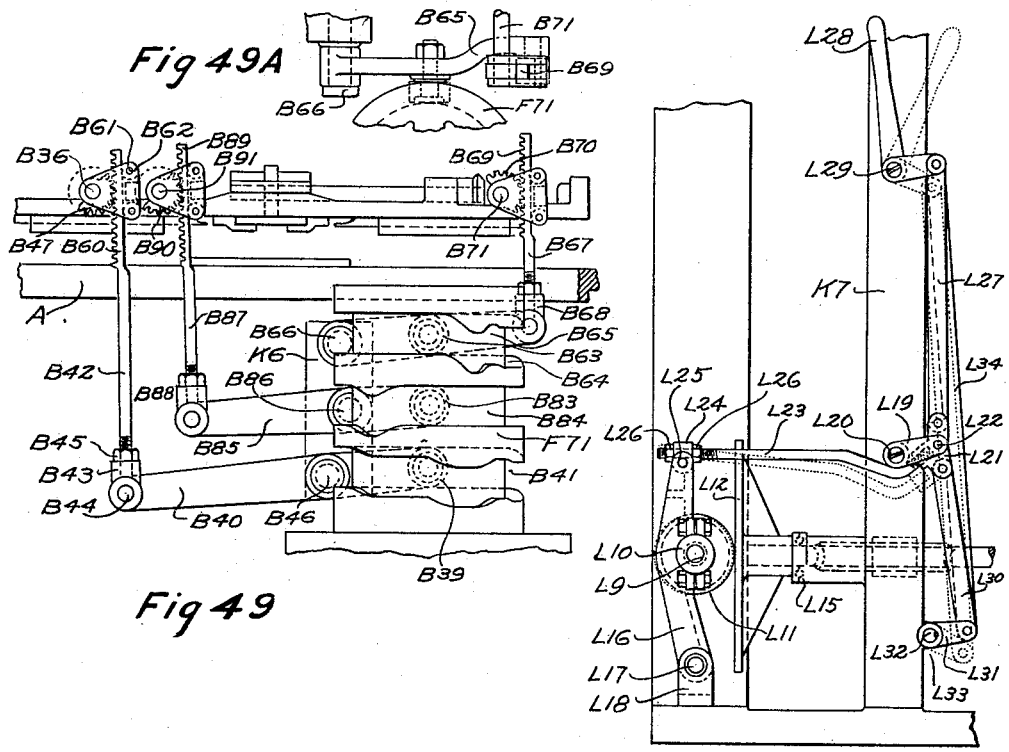
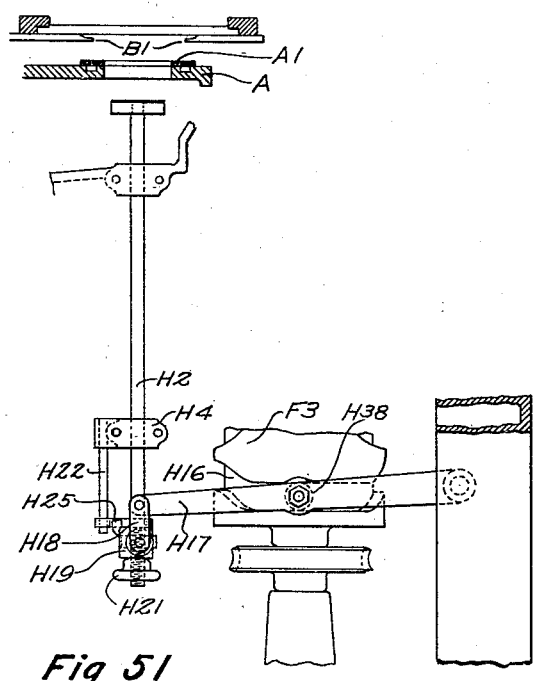
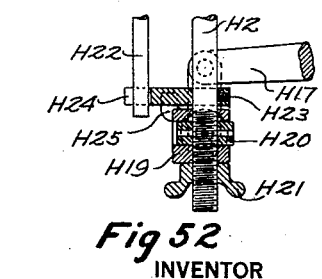
INVENTOR
Robert H. Fenn Feb. 10, 1931.   R. H. FENN   1,791,960
AUTOMATIC BOX MACHINE
Filed Oct. 31, 1925   14 Sheets-Sheet 12

INVENTOR
Robert H. Fenn

Feb. 10, 1931.  R. H. FENN  1,791,960
AUTOMATIC BOX MACHINE
Filed Oct. 31, 1925   14 Sheets-Sheet 14
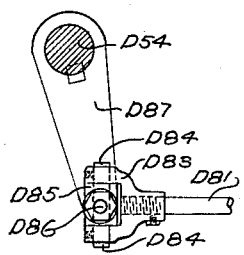
Fig 66
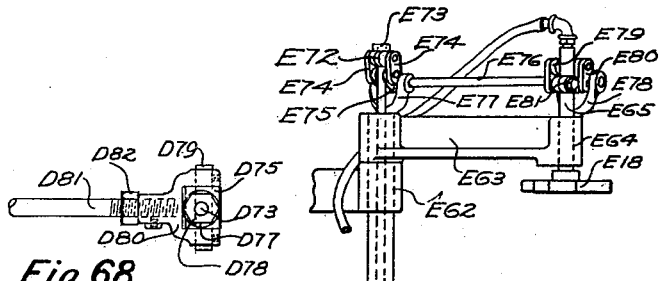
Fig 68
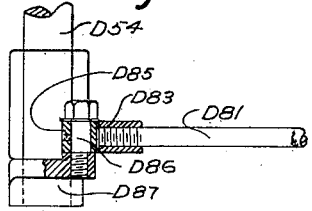
Fig 67
Fig 69
Fig 70
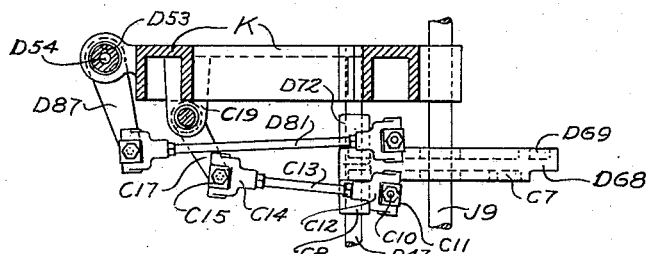
Fig 71
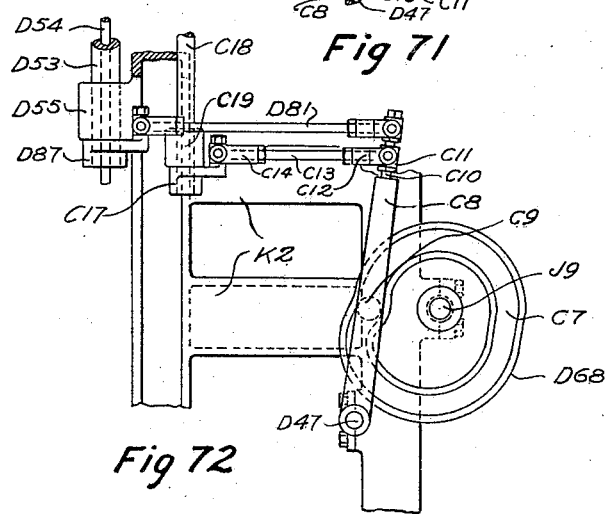
Fig 72
INVENTOR
Robert H. Fenn Patented Feb. 10, 1931

1,791,960

UNITED STATES PATENT OFFICE

ROBERT H. FENN, OF WHITESTONE, NEW YORK

AUTOMATIC BOX MACHINE

Application filed October 31, 1925. Serial No. 65,979.

This invention relates to machines for automatically, continuously and rapidly making boxes from cardboard and paper.

The object of this invention is to provide a machine that requires nothing further from the operator, toward the making of a box, than the filling from time to time, of the box blank and box label magazines and the adhesive reservoir; the entire operation of making a box being performed entirely automatically by the machine.

One of the objects of this invention is to provide a machine that will automatically, by means of a carrier, extract a cardboard body blank from a magazine, deliver it to a slide that, in turn, delivers it to a mechanism adapted to fold it up in box form around a plunger.

Another object is to provide a mechanism comprising a magazine adapted to carry a stack of cut cover labels and means for extracting them singly therefrom by a carrier.

Another object is to provide a rotary table having a plurality of suction platens each adapted to hold a label tightly to its face, as said label is delivered successively, by a carrier, to each platen as said table periodically makes a partial revolution.

Another object is to provide a mechanism for applying adhesive, by means of a roller, to each label, as between each periodical partial rotation of said table, it is presented in position to allow said roller to coat it uniformly with adhesive, a sufficient number of platens being provided, between the adhesive station and the point of application of said coated label to the folded box body, to allow time for the adhesive on each label to dry to a sticky condition in which it will adhere firmly to said box body when applied.

Another function of the rotary table is to convey labels coated with adhesive, singly, to position within a box covering mechanism, under a folded box blank, so that it can be folded by said mechanism, around said box blank; over its upper edges, and thence, downwardly inside, making a complete box, entirely automatically, from the box blank, box label and adhesive.

The type of box made by this machine is shown in Fig. 65, consisting of a box blank cut as shown in Fig. 53, bent up and covered by a glued box label, cut as shown in Fig. 54; in a form having a bottom and side walls with the top open.

This invention consists of a single organized machine comprising several interdependent and harmoniously operating mechanisms.

The invention is shown in the several sheets of accompanying drawings, in which—

Fig. 1 is a perspective of the machine as seen from the blank magazine side.

Fig. 2 is a plan view of one of the safety clamps used on the telescoping vertically reciprocated plunger tubes.

Fig. 3 is a front elevation, in partial section, of said clamp described under Fig. 2.

Fig. 4 is a side elevation of said clamp described under Fig. 2.

Fig. 5 is a part sectional view of one of the air valves, closed, controlling air suction;

Fig. 6 is the same as Fig. 5 but with the valve open.

Fig. 7 is a side elevation with some parts eliminated and others in section.

Fig. 8 is a side sectional elevation of sub-plunger and risers.

Fig. 9 is an end elevation of sub-plunger and risers.

Fig. 10 is a plan view of the complete machine.

Fig. 11 is a plan view of part of the table and the table valve.

Fig. 12 is a plan view of part of the table and the table valve.

Fig. 12A is a part sectional elevation of the table valve.

Fig. 13 is a plan view of the machine below about the level of A B, Fig. 1.

Fig. 14 is a plan view of the table operating mechanism.

Fig. 15 is a plan view of the table lock mechanism.

Fig. 20 is a plan view of the corner and the top folding mechanism.

Fig. 21 is a vertical section about on line A B, Fig. 20.

Fig. 22 is a plan view from the under side of the corner and the top folding mechanism.

Fig. 23 is a vertical section about on line C D, Fig. 20.

Fig. 24 is a plan detail of the side folder.

Fig. 25 is a plan detail of the corner folder.

Fig. 26 is a plan detail of the yoke and adjusting screw that operates the corner turner of Fig. 25.

Fig. 27 is a plan section of the pressure friction device used against the adjusting screw of Fig. 26.

Fig. 27A is a section of the assembled side folder and corner folder in their guides.

Figure 31:
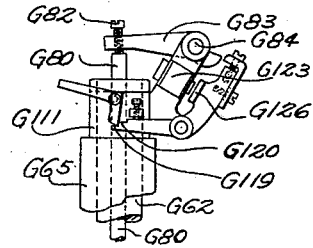
Fig. 31 is a side elevation of the magnetic lock to hold the glue roller up from contact with the suction platens; lock open.
Figure 32:
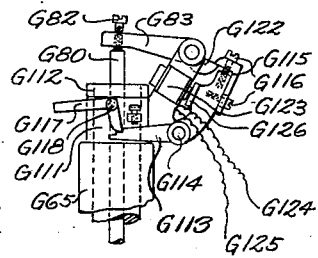

Fig. 32 same as Fig. 31; lock closed.

Figure 33:
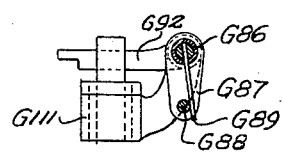

Fig. 33 is a part sectional end elevation of the glue roller lifting mechanism.

Figure 34:
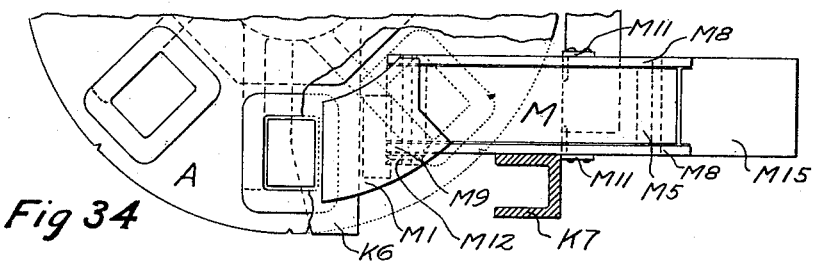

Fig. 34 is a plan view of part of the rotary table cut away to show the belt conveyor.

Figure 35:
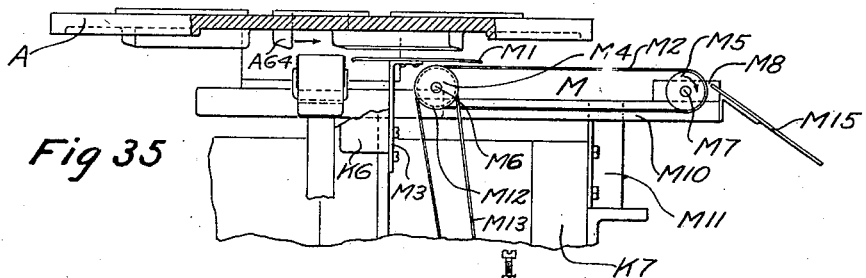

Fig. 35 is a part sectional side elevation of the belt conveyor.

Figure 36:
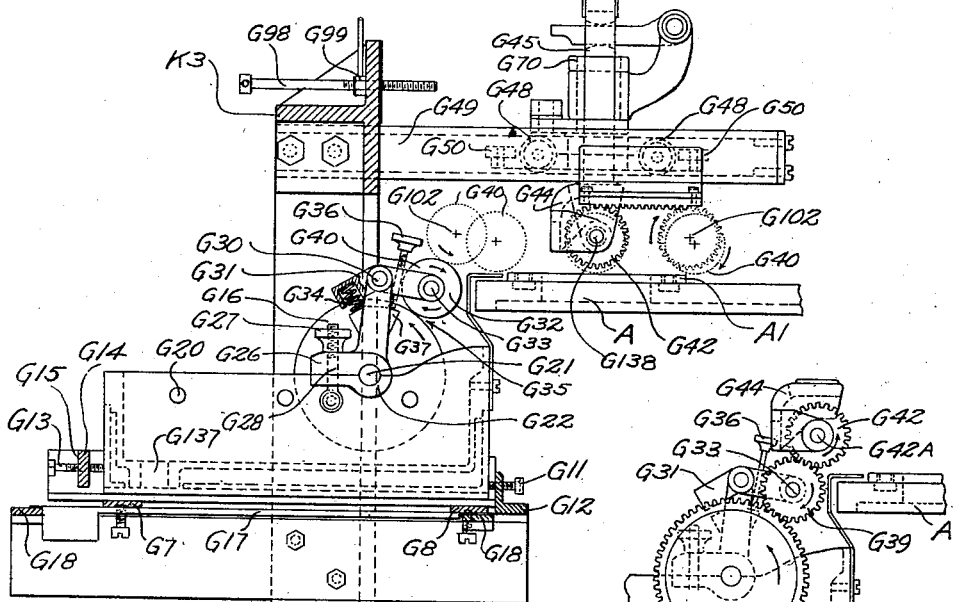

Fig. 36 is a part sectional side elevation of the gluing mechanism.

Figure 37:
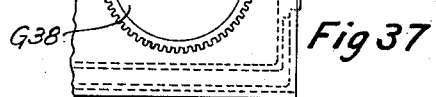

Fig. 37 is an end elevation of the gear drive for the gluing mechanism.

Figure 38:
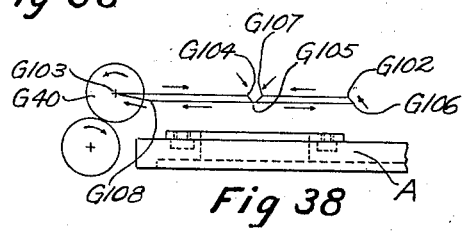

Fig. 38 is a side view showing the path of the centre of the glue roller.

Figure 39:
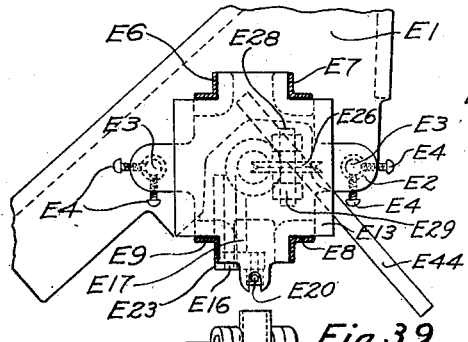

Fig. 39 is a sectional plan view of the label magazine.

Figure 40:
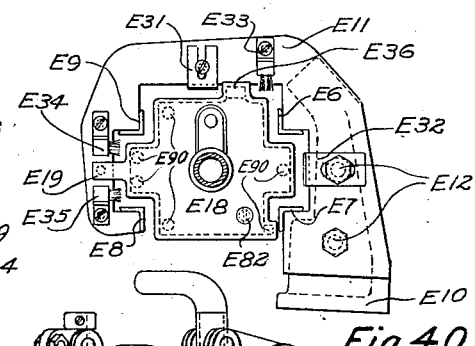

Fig. 40 is a sectional plan view of the label magazine with the suction head.

Figure 41:
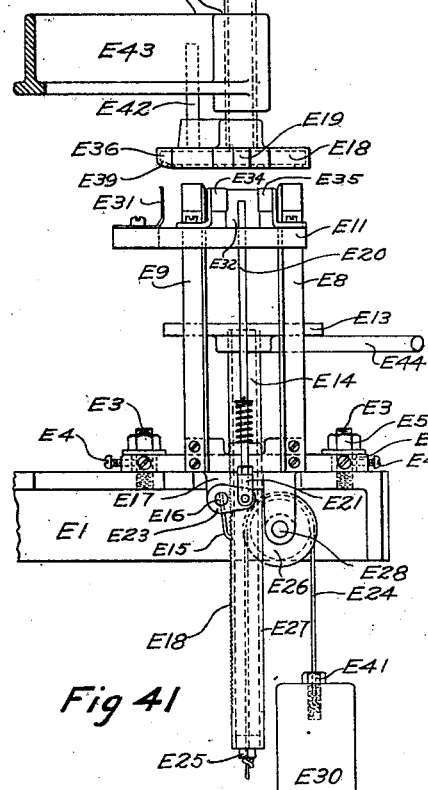

Fig. 41 is an end elevation of the label magazine.

Figure 42:
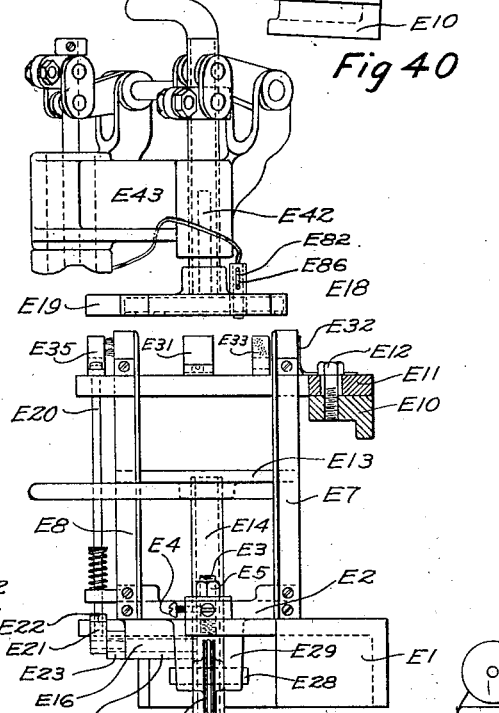

Fig. 42 is a side elevation of the label magazine.

Figure 43A:
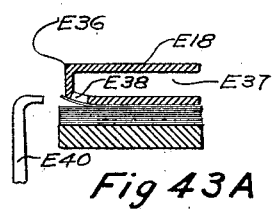
Figure 43:
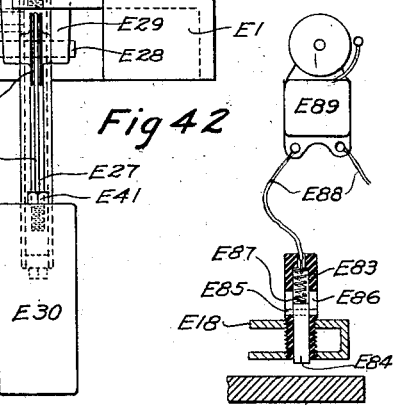

Fig. 43 is a sectional elevation detail of the electrical contact device.

Fig. 43A is a part sectional view of labels in the magazine the topmost label being lifted at one edge.

Fig. 44 is a plan view, part sectional, of the blank magazine with the feed slide.

Fig. 45 same as Fig. 44 but with the suction head.

Fig. 46 is an end elevation of the blank magazine, part in section.

Fig. 47 is a side elevation of the blank magazine, part in section.

Fig. 48 is a part sectional elevation of the blank aligning device.

Fig. 49 is an elevation of the cams and the operating mechanism for the side, end and corner folding mechanism shown in Figs. 20 to 23.

Fig. 50 is a side elevation of the start and stop control mechanism and drive.

Fig. 51 is a side elevation of the sub-plunger operating and adjustment mechanism.

Fig. 52 is a vertical sectional detail of the subplunger height adjusting device.

Figure 53:
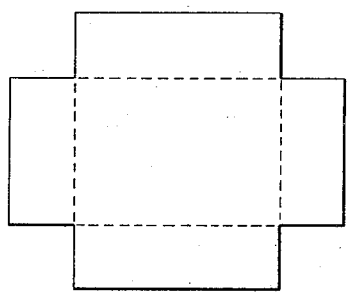

Fig. 53 is a plan view of the card board body blank.

Figure 54:
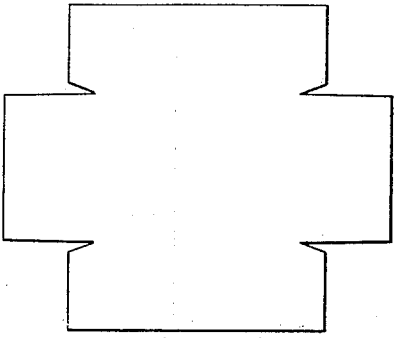

Fig. 54 is a plan view of the paper label.

Figure 55:
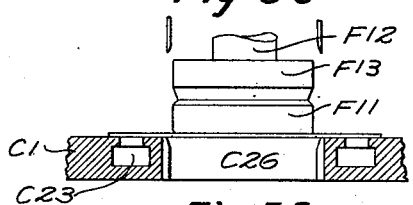

Fig. 55 is a part sectional vertical view of the plunger descending on the box blank.

Figure 56:

Fig. 56 is a part sectional vertical view of the plunger driving the box blank down through the slide.

Figure 57:
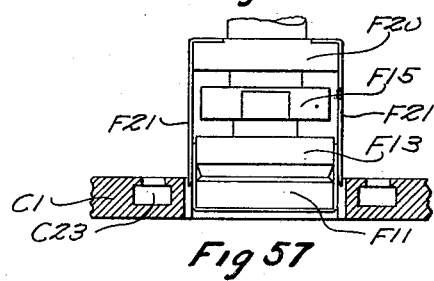

Fig. 57 is a part sectional vertical view of the box blank folded up around and held to the plunger by the clamp fingers.

Figure 58:
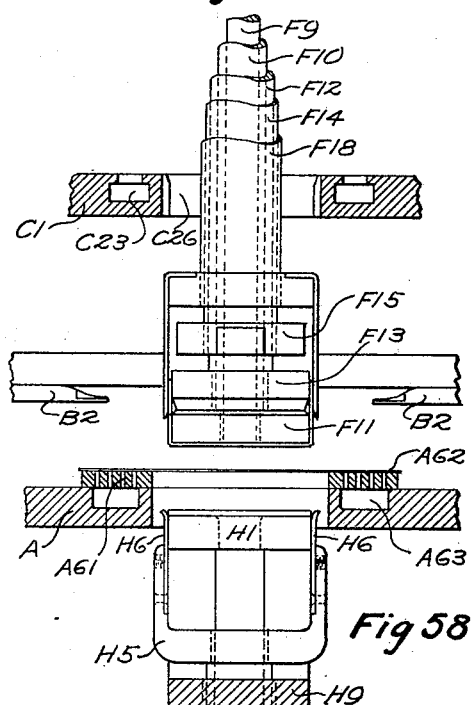

Fig. 58 is a part sectional vertical view of the folded box blank after having passed down through the feed slide; the label lying on the suction platen and sub-plunger ascending to support centre of label.

Figure 59:
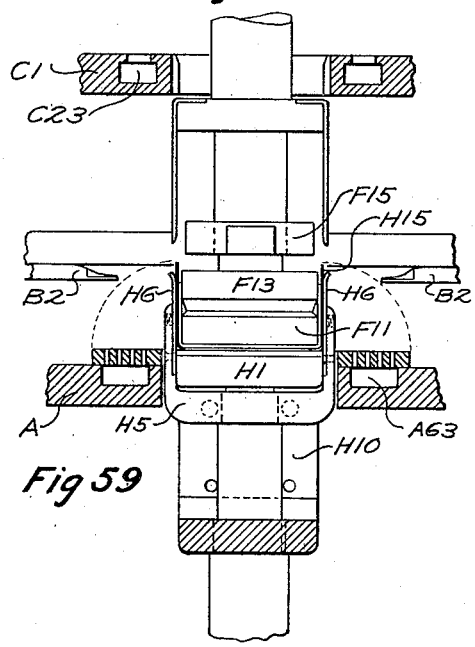

Fig. 59 is a part sectional vertical view showing the sides of the label folded up about the box.

Figure 60:
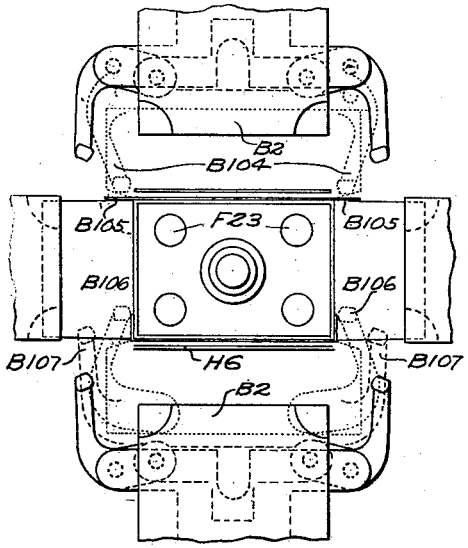

Fig. 60 is a plan view of the corner label folder mechanism with various positions of the folder fingers.

Figure 61:
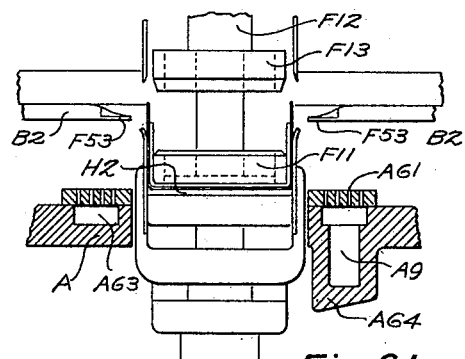

Fig. 61 is a part sectional vertical view showing the edges of label ready to be turned over the top of the box.

Figure 62:
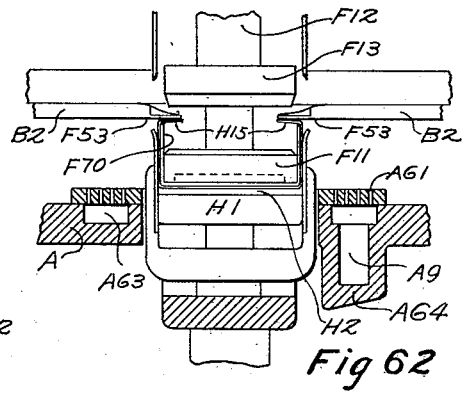

Fig. 62 is a part sectional vertical view showing the edges of the label folded over the top edges of box.

Figure 63:
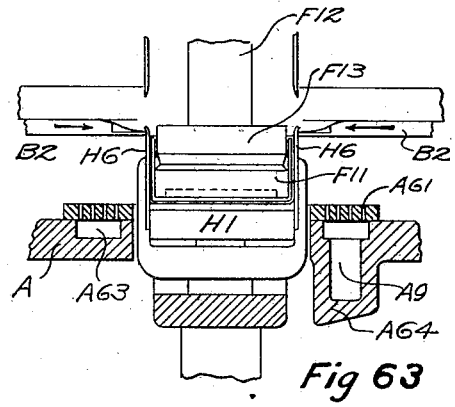

Fig. 63 is a part sectional vertical view showing the edges of the label turned down into the box and pressure being applied by the end and side folders.

Figure 64:
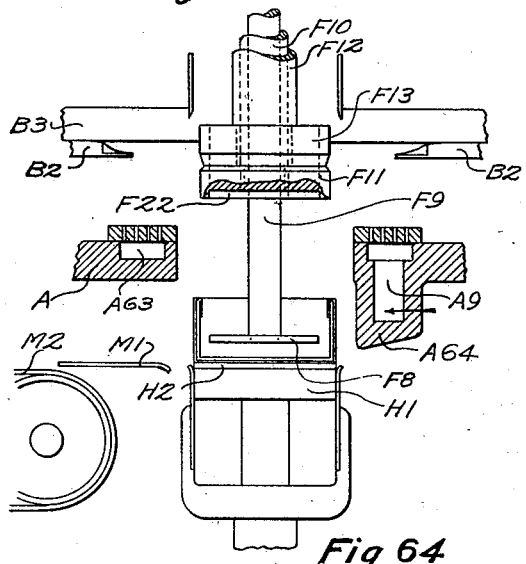

Fig. 64 is a part sectional vertical view showing the plunger withdrawn from the finished box; said box resting on said sub-plunger and ready to be swept from same to the discharge conveyor for delivery from machine.

Figure 65:
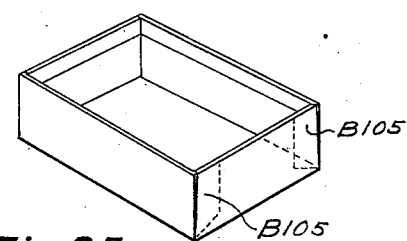

Fig. 65 is a perspective view of the finished box as made by the machine.

Fig. 66 is a plan view of the lower slide lever and fork.

Fig. 67 is a part sectional elevation of the lower slide lever and fork.

Fig. 68 is a plan view of a cam lever and fork.

Fig. 69 is a part sectional elevation of a cam lever and fork.

Fig. 70 is a side elevation of the operating mechanism of the label suction head.

Fig. 71 is a plan view of the blank and slide swing arm mechanism.

Fig. 72 is a side elevation of the blank and slide swing arm mechanism about on the line AB, Fig. 13.

A general description of the machine with its coordinated mechanisms is as follows:—

For brevity, the cardboard blank, Fig. 53, (which may be made of any other material adaptable for the purpose) which is scored and cut, or blanked out on a press, from which the body of the box is made, will hereinafter be designated a "blank."

Similarly the paper blank used to cover the cardboard body of the box, Fig. 54, which is also blanked out on another machine, will hereinafter be referred to as a "label".

In Figs. 1, 7, 10, 13, and 16,—

A is the table carrying the suction platens.

B is the folder frame carrying the mechanism for folding and turning in the label of the box.

C is the feed slide that conveys the blank under the plunger.

D is the blank magazine.

E is the label magazine.

G is the sub-plunger and parts.

H is the gluing mechanism.

J is the air suction valves.

K 1, 2, 3 etc. are parts of the frame supporting the various mechanisms of the machine.

L is the drive and the control mechanism.

M is the discharge belt conveyor.

A specific description of the machine and its operation follows:—

The blanks are placed scored side down, in the magazine at D, Fig. 1, between the guides D 1, D 2, D 3, D 4, Figs. 13, 16, 44, 45, 46, 47, which are fastened to the base D 5. This base D 5 is provided with holes D 6 larger than the studs D 7 so that the base and magazine may be adjusted to a given position and then held in place by the nuts D 8. The screws D 9 are adjusted against the studs D 7 to position said base D 5 and thereafter maintain such setting.

The guides D 1, 2, 3, 4 are supported at their upper ends by the top bracket D 10, in turn supported by the frame bracket D 11. This top bracket D 10 is also adjustable by means of holes provided which are larger than the studs D 12, so that the top of the magazine may be adjusted to coincide with the base setting.

The stack of blanks is carried on the blank platen D 13 which is adapted to slide freely between the guides D 1, D 2, D 3, D 4, and is in turn supported by the rack tube D 14 which slides through and is guided by a hole in the base D 5. A pawl D 15 carried by the pin D 16 which is supported in the bearing D 17 on the bottom of the base D 5 is actuated by the lever D 18, the pin D 19, the rod end D 20, the tripper rod D 21, the latter adjustable vertically by means of its threaded fastening into the rod end D 20 and locked by means of the nut D 22. The compression spring D 23 around the rod D 21 resting on the forked projection D 24 and acting against the pinned washer D 25 normally keeps the pawl D 15 in engagement with the rack D 26.

The rack tube D 14 is supported by means of steel ribbons D 27 fastened to the lower end of said rack tube and thence passing upwardly along the outside of said rack tube and over the flanged pulleys D 28, the latter rotating on the pins D 29 carried in bearings D 30 depending from the base D 5, and thence downwardly and finally fastened to the weight D 31.

This weight is sufficient to over balance the weight of the rack tube and the blank platen and the full stack of blanks and thus tends to raise the stack of blanks at all times. The weight D 31 is provided with a central hole and slides freely over the guide tube D 32 which is held in a flange fitting and is adjustably mounted on the base K 1.

At D 33 and D 34 are two spring aligning devices, adjustably mounted; their function is to position, with precision, the upper blanks in the magazine as they come opposite said aligning devices, that is, device D 33 pushes the upper blanks against guides D 2 and D 3 and device D 34 pushes the upper blanks against guides D 3 and D 4. The aligning of said blanks is illustrated in Fig. 48.

As the suction head D 35 descends the projection D 36 depresses the tripper rod D 21 and disengages the pawl D 15 from the rack D 26, whereupon the action of the weight D 31 raises the blank platen D 13 and presses the top blank firmly against the face of said suction head. On rising, the suction head carries with it the uppermost blank.

In order to prevent more than one blank being extracted from the magazine, at a time, the brushes D 37, adjustably mounted, are provided. Should one or more blanks adhere together the bristles of said brushes, which are adjusted to brush the edges of said blanks, allow the topmost blank to be extracted by the suction head but separate and hold in the magazine any adhering blanks.

As the suction head rises, the tripper rod, actuated by the spring D 23, also rises and once more permits the pawl D 15 to engage the nearest tooth in the rack D 26. Thus as the blanks are removed from the top of the magazine the stack continually rises but is maintained at its operating height, after each withdrawal of a blank, by the reengagement of the pawl with the nearest rack tooth. To load the magazine which may be done while the machine is in operation, the blank platen is pushed downwardly by means of the handle D 38, the pawl D 15 maintaining engagement with the rack at any position of the blank platen, and, at any time when the suction head D 35 is not over the magazine, a stack of blanks, several inches high, may be slid down into the magazine; this may be repeated until the magazine is fully loaded.

The suction head D 35 is hollow, and is provided with holes D 39 through its lower face, and is carried by the tube D 40 which reciprocates vertically in a bearing D 42 at the end of the swing arm D 41. This tube D 40 serves, in connection with the hose D 43, Fig. 1, as an air suction duct communicating with the valve J 1 which controls the suction. The reciprocation of the suction head D 35 is effected by the cam D 44, Figs. 1, 8 and 13 through the train of mechanism comprising the cam roller D 45, the lever D 46 pivotally mounted on the cam lever shaft D 47, the link D 48 pivotally connected at one end to said lever 46 and at the other to the bell crank lever D 49, the latter pivotally mounted on the frame K 2 on the pin D 50. The bell crank lever D 49 is in turn pivotally connected by the links D 51 to the clamp collar D 52 clamped to the push rod D 53 which reciprocates vertically through the hollow swing shaft D 54 the latter oscillating in the bearings D 55 and D 56.

A set collar D 57 is fitted to the upper end of the push rod D 53 and maintains the loose collar D 58 between itself and a shoulder on the push rod D 53. The loose collar D 58 is pivotally connected by the link D 59 to the lever D 60 which is keyed to the oscillating shaft D 61 carried in the bearings D 65 D 66 on the swing arm D 41. At the opposite end of the shaft D 61 the forked lever D 62 is keyed fast and pivotally connected by the links D 63 to the clamp collar D 64 clamped fast to the tube D 40. Between the clamp collar D 52 and the hub of the lever D 87 a compression spring D 67 encircles the push rod D 53; the function of this spring is to keep the cam roller D 45, at all times, in contact with the periphery of the cam D 44 incidentally to cause the suction head D 35 to rise and fall in conjunction with the configuration of the cam D 44.

The swing arm D 41 is fastened to the upper end of the hollow shaft D 54 and rests upon the bearing D 56. The said shaft and swing arm are oscillated by means of the double face cam D 68 provided with the race D 69 and its train of mechanism, D 70 cam roller rotatably mounted by the pin D 71 on the cam lever D 72 Figs. 13 and 53, 68 and 69; the latter pivotally mounted on the shaft D 47. Into the upper end of the cam lever D 72 is threaded the stud D 73 locked to a setting by the set screw D 74. The fork block D 75 is pivotally mounted on the upper end of the stud D 73 and held in place by the washer D 77 and nut D 78. The block D 75 is provided with holes into which fit the pins D 79 fastened into the fork D 80, allowing said block to rock on said pins. Threaded into this fork D 80 is the link rod D 81 locked to a setting by the nut D 82. The other end of the link rod D 81 is threaded into another fork D 83 similar to the fork D 80 with similar pins D 84 and block D 85. The stud D 86 on which the block D 85 is rotatably mounted is threaded into and fastened to the blank swing shaft lever D 87 which is keyed to the lower end of the swing shaft D 54.

Thus, following the train of mechanism from cam D 68 to swing arm D 41, the cam lever D 72 is oscillated by the cam; the cam lever D 72, through the link rod D 81, oscillates the blank swing shaft lever D 87 in turn oscillating the swing shaft D 54. The oscillation of the latter causes the swing arm D 41 to alternately position the suction head D 35 over the blank magazine D and then over the feed slide C 1, providing the means to extract a blank from the magazine, conveying it to and delivering it to the feed slide C 1.

Adjustment is therefore provided for changing the angle of the oscillation of the swing arm and also the position of the path of oscillation, the former by adjusting the stud D 73 outwardly to increase the angle of oscillation, or inwardly to decrease it. The link rod D 81 has a right and left handed thread at opposite ends so that turning it about its axis decreases or increases the distance between the stud D 73 and the stub D 86 thereby changing the position of the path of oscillation of the swing arm. In addition to this adjustment a stop arm D 88 provided with contact screws D 89 and lock nuts limits the oscillation of the swing arm D 41 as the contact screws alternately strike the arm C 5.

The feed slide C 1 is supported by and slides between the ways C 2, Figs. 7, 10, 16, 20, 21 and 23, and is held from jumping up by the guards C 3 which overlap the edge of the slide. The slide is shown at the end of its stroke to the right in contact with the stop screws C 4; at the end of its stroke to the left it comes into contact with the stop screws C 6 which brings it directly under the plunger F 11. The slide is reciprocated by a train of mechanism and cam similar to that of the swing arm D 41.

It is shown as follows,—the cam D 68, the race C 7, the cam lever C 8, the cam roller C 9, the cam lever stud C 10, the fork block C 11, the fork C 12, the link rod C 13, the fork C 14, the fork block C 15, the stud C 16, the slide shaft swing arm C 17, the vertical slide shaft, C 18, oscillating in the bearings C 19 and C 20, the slide arm C 21, and the slide link C 22 pivotally connecting the slide arm C 21 with the slide C 1. The operation is also similar and the same adjustments for length of stroke and position of path of oscillation are provided.

The slide is provided with a suction air duct C 23 connected with the valve J 2 by the hose C 24; holes C 25 are provided in the upper face of the slide communicating with the said air suction duct. When the suction head D 35 delivers a blank to the feed slide C 1 the suction is cut off from the suction head by the valve J 1 and immediately applied through the air duct C 23 by the valve J 2 so that the blank is held firmly to the slide by air suction.

As before described adjustments are provided both for the position of the suction head D 35 and for the slide C 1 so that the blank may be placed exactly in position on the slide C 1.

The label magazine E shown in Figures 10, 16, 39, 40, 41, 42, is very similar to the blank magazine. The bracket E 1 supports the base E 2. The studs E 3, passing through the clearance holes in the base E 2, allow lateral adjustment of the base. The screws E 4 are adjusted against the studs E 3 to preserve a setting and the nuts E 5 lock the base in position. The four guides E 6, E 7, E 8 and E 9 are fastened to the base E 2. At the top the bracket E 10, is fastened to the machine frame, carries the top guide E 11 also subject to lateral adjustment to coincide with the base E 2 by means of clearance holes, through which the screws E 12 pass; the latter also lock the top guide to a setting. The four guides E 6, E 7, E 8 and E 9 are fastened to the top guide. The label platen E 13 carried on the top of the rack tube E 14, which passes through a guide hole in the base E 2, is positioned within, and is freely slidable vertically between, the four guides E 6, E 7, E 8 and E 9.

A pawl E 15 mounted on the shaft E 16, carried in the bearing E 17, engages the teeth of the rack E 18 on the rack tube E 14. In operation the lug E 19, on the label suction head E 18, strikes the top of the trip rod E 20 which is threaded into the rod end E 21 and locked by the nut E 22; the rod end E 21 is pivotally connected to the lever E 23 fastened to the end of the shaft E 16; the depression of the rod E 20 therefore disengages the pawl E 15 from the rack E 18.

A wire rope E 24 is knotted and passes upwardly through a hole in the nut E 25, screwed into the lower end of the tube E 14, thence upwardly and centrally through said tube and over a V groove pulley E 26 which projects into said tube through a slot E 27. The pulley E 26 is rotatably mounted on the pin E 28 carried in the bearings E 29 depending from the base E 2. The weight E 30 is fastened to the other end of the rope E 24 by the hollow screw E 41 through which said rope passes and is also knotted. The further operation of the device is exactly similar to that of the blank magazine. It may be loaded in the same way with a stack of labels, a handle E 44 is provided to facilitate depression of the label platen E 13. Aligning springs E 31 and E 32 are provided, also brushes E 33, 34 and 35 for separating and holding, in the magazine, any adhering labels. In addition, the suction head E 18 is provided with a projection E 36 communication with the suction chamber E 37 and with a hole E 38 through its lower upwardly curved face E 39. The action of this device is shown in Fig. 43A; the suction, effective through the hole E 38, pulls one edge of the top label upwardly against the face E 39 thus separating the top label from those below. One or more air jets E 40 may also be introduced, in the case of large labels, to further aid the separation of the top label from those below.

Both the blank suction head D 35 and the label suction head E 18 are held from turning about their vertical axes, the former by the pin D 89 which is adapted to reciprocate vertically through a hole in the swing arm. D 41, and the latter by the pin E 42 which is adapted to reciprocate vertically through a hole in the swing arm E 43.

The movement of the label suction head E 18 from over the label magazine E, to a position over a suction platen A 1, when opposite the label station E and its vertical reciprocation is effected, Fig. 70, in a manner similar to that used for the blank suction head D 35.

The cam roller E 45 rotatably mounted by the pin E 46 on the lever E 47, which is pivotally mounted on the shaft D 47, runs in the race way E 48 of the cam E 49. As the cam revolves it oscillates the cam lever E 47 which through the stud E 50, the fork block E 51, the fork pins E 55, the link rod E 53 (provided with a right hand thread at one end and a left hand thread at the other) connects the two forks E 52 and E 54, into which it screws; the fork pins E 56, the fork block E 57, the stud bolt E 58; the lever E 59, keyed fast to the hollow vertical swing shaft E 60; the latter carried in bearings E 61 and E 62, oscillates this shaft E 60; the swing arm E 63, keyed fast to the top of the shaft E 60 is provided with a bearing E 64 through which the label suction tube E 65 reciprocates, the hollow suction head E 18 is fast to the lower end of this tube E 65.

The cam roller E 66 rotatably mounted on the cam lever E 67, which is in turn pivotally mounted on the pin E 68, runs in the race way in the back of the cam E 49 and oscillates the lever E 67 as the cam revolves. The cam lever E 67 pivotally connected by the links E 69 to the clamp collar E 70 which is clamped fast to the push rod E 71 raises or lowers said push rod as it oscillates. The loose collar E 72 held between a shoulder on the push rod E 60 and the tight collar E 73 is pivotally connected by the links E 74 to the forked lever E 75 this latter lever keyed fast to the rock shaft E 76 rocking in the bearings E 77 and E 78. At the other end of the rock shaft E 76 a forked lever E 79 is keyed fast, it is pivotally connected by the links E 80 to the clamp collar E 81. Thus the cam E 49 oscillates the lever E 67, the push rod E 60 reciprocates, the rod E 76 rocks and the suction head E 18 rises or falls in conjunction with the cam outline.

The rotary table A, Figs. 1, 7, 10 to 12, 15, 16, 21, 23, 28, 34 to 38, 49, 51, 55 to 59 and 61 to 64, has a central spindle A 2 depending from it, running in the guide bearing A 3; the weight of the table is carried by the ball bearing A 4: The said spindle is hollow and is connected at its lower end by means of a stuffing box A 5 to the air suction pipe A 6 in turn connected to a vacuum exhauster. The upper end of this passage A 7 enters a chamber A 8 from which radiate the air passages, A 9 to A 16 inclusive, each communicating with a rectangular passage A 63 under the label platens A 1. These platens are perforated as shown in Fig. 58 by holes A 61, and adapted to hold a label to their upper face by suction. They conform in outline to that of the label Fig. 54 but are enough smaller so that the label A 62 overlaps the edge of the platen A 1 shown in Fig. 10 by a small margin as shown in Fig. 58. In each of said air passages A 9 to A 16 is a valve A 17; when these are fully open an equal distribution of air suction is provided from each platen; by partially closing a valve the suction to any platen may be decreased.

Fitting into the chamber A 8 is the valve body A 18, fastened to the table A by the screws A 21, Figs 7 and 12A, provided with passages A 19 coinciding with the openings of the passages A 9 to A 16, a valve A 20 adapted to oscillate against the lower face of the valve body A 18 controls the air suction in the air passages leading to the particular three platens that may at any time, be positioned at stations 7, 8 and 1. The valve A 20 is carried on the lower end of the valve shaft A 22; at the upper end a stuffing box a 23 and nut A 24 prevent loss of suction around the shaft A 22. A compression spring A 25 encircling the shaft A 22 between the ball thrust bearing A 26, and the lever A 27, keeps the valve A 20 always in contact with the lower face of the valve body A 18. The valve A 20 is oscillated by the cam A 28, Fig. 7, carried on the vertical cam shaft F 2 through the cam roller A 29, the cam lever A 30 (Fig. 10.) pivotally mounted on the pin A 31, the lever A 30 being pivotally connected by the link A 32 to the lever A 27. A tension spring A 33 holds the cam roller A 29 always in contact with the peripheral face of the cam A 28. In operation, Fig. 12, the table A is just ready to move, the passages A 9 and A 10 are shown closed by the valve A 20 indicated by shading. As the table A rotates in the direction of the arrow, a partial revolution, the valve A 20 also rotates with the table to the position shown in Fig. 11 thus maintaining a closure of the passageways A 9 and A 10 to prevent less of suction through the perforations of their respective platens. During operation, it should be noted that all platens on the table A, are each covered by a label, except those opposite stations 7, 8, and 9; the platen opposite station 8 never has a label on it while the platen opposite station 7 is covered by a label part of the time as is also that platen opposite station 1. The valve A 20 maintains, at all times, a closure of the passageway leading to the platen opposite station 8. When in the course of applying the label to a box the platen opposite station 7 is uncovered the valve A 20 moves back to the position shown in Fig. 12 and recloses the passageway leading to it; but in the meantime, and before the valve A 20 opens the passageway leading to the platen at station 1, a label is placed on said latter platen by the suction head E 18, thus no suction is lost during these and similar repeated operations.

The rotation of the table is effected by a modified ratchet device, Figs. 1, 7, 14 and 16. The ratchet head A 34 is fastened to the under side of the table A, in its upper face are eight holes A 35 (should six platens be used, on the table, six holes would suffice etc.) with their centres arranged at the apices of an octagon. The ratchet pawl A 36 is adapted to fit into and turn freely in said holes A 35. Connecting each hole in sequence is a shallow raceway A 37, this serves to guide the ratchet pawl from the hole in position A 38 to that in position A 39, Fig. 14. As the ratchet head swings in rotation the ratchet pawl A 36 turns in the hole A 35. The ratchet pawl is operated by a cam roller A 40, rotatably mounted on the bell crank lever A 41, and running in a raceway F 4 of the barrel cam F 3. A fork A 42 pivotally connected to a fork block A 43 is rotatably mounted on the stud A 44 threaded into the opposite end of said bell crank lever; threaded into the fork A 42 is the link rod A 45 locked by the nut A 46, the other end of said link rod is threaded into the ratchet pawl A 36 and locked by nuts A 47. By adjusting the stud A 44 inwardly or outwardly the length of stroke of the ratchet pawl A 36 can be varied, by turning the rod A 45, which has a left hand thread at one end and a right hand thread at the other, the position of the path of the ratchet pawl A 36 can be varied. On the forward stroke of the ratchet pawl it stops at position A 38 after causing the table A to rotate an eighth of a revolution. Before the ratchet pawl makes its return stroke the T head rod A 48 actuated from the periphery of the cam D 68 through the cam roller A 49 and the cam lever A 50, pivotally mounted and connected, rises and lifts the ratchet pawl A 36 out of the hole A 35 at position A 38 by engaging the pin A 51 projecting from said ratchet pawl. Disengaged from the hole at position A 38, the ratchet pawl A 36 slides, on its rearward stroke, through the shallow raceway A 35 until it reaches position A 39, whereupon the T head rod A 48 having descended the said ratchet pawl drops into the hole A 35 at position A 39, and is again ready to make a forward stroke. To assist in overcoming the momentum of the table as it is brought to a stop at the end of the stroke of the ratchet pawl A 36 the tension spring A 52 is fastened to the frame K 4 at A 53 and to the lever A 41 at A 54; the tension of the spring increasing, toward the end of the stroke of the lever A 41, the table is brought quietly to rest. To insure that the table shall remain fixed between the periods of rotation a groove A 55 is provided opposite each platen A 1. At station 7 as shown in Figs. 10 and 15 a pawl A 56, actuated by the cam A 57 on the shaft F 2 through the cam roller A 58 and the pivotally mounted lever A 59 is provided. The end of the lever A 59 passes through a slot in the pawl A 55. As the table A comes to rest the cam A 57 allows the pawl A 56, impelled by the compression spring A 60, to drop into the groove A 55, opposite, and lock the table immovably until the next period of table rotation begins.

The adhesive applying device is shown in Figs. 1, 7, 10, 13, 28 to 33, and 36 to 38. A tank having an inner wall G 1 and an outer wall G 2 with an air space G 3 between is carried in a cradle G 5, 6, 7, 8. This cradle is supported by, and adjustable vertically by the screws G 9 which fit into recesses in the bars G 7 and G 8, said screws being threaded through the supporting angles G 4 carried on the frame K 3. The position of the tank is adjustable laterally by the screws G 10 threaded through the angles G 5 and G 6, the tank is adjustable longitudinally by the screws G 11 threaded through the angle G 12 which is fastened to the angles G 4. The lock screw G 13, threaded through the lock bar G 14, which fits into slots G 15 in the angles G 5 and G 6 locks the tank to a setting against the screws G 11. Thus the tank is adjustable, vertically, laterally and longitudinally or it can be skewed.

The adhesive in the tank must always be kept at a level so that the lower periphery of the roller G 16 is immersed in it. The adhesive is heated by an electric heating element G 17 supported on the cross bars G 18, it is placed directly below an opening G 19 in the bottom of the outer tank G 2. The heated air rising from the heating element passes upwardly through the space G 3 around the inner tank and out through the holes G 20.

The glue roll G 16 carried on the shaft G 21 is supported in the bearings G 22. The motor G 23 drives the counter shaft G 24 and a belt from pulley G 25 drives the grooved pulley G 26 which incidentally drives the glue roll G 16. The bearing caps G 26, which can be removed by releasing the nuts G 27 on the pivoted screws G 28 and swinging them out of the slots G 29, also carry the bearings for the pivot rod G 30 on which the spring levers G 31 are pivoted. At one end of these levers G 31 a bearing supports the feeder roll G 32 carried on the shaft G 33. Compression springs G 34 maintain the feeder roll G 32 pressed toward the glue roll G 16. The glue carried up by the roll G 16 is squeezed out from between the two rolls at G 35 and falls back into the tank. The adjusting screws G 36 are provided, and being threaded through the spring lever G 31 and resting against the stop G 37, the feed roll may be adjusted to vary the thickness of coating of glue passing between the two rollers G 16 and G 32 and adhering to the periphery of roll G 32 as may be desirable. The feed roll G 32 is positively driven from the glue shaft by the gear G 38 meshing with the gear G 39 on the end of the feed roll shaft. An opening, closed by a plug, G 137 is provided in the bottom of the tank G 1 to allow draining off the adhesive.

A transfer roll G 40, made of rubber or similar material, is mounted on a hollow shaft G 41. A gear G 42 of the same pitch diameter as the diameter of the transfer roll G 40, is mounted on the end of said hollow shaft G 41. The transfer roll is rotatably mounted on the pin G 138 supported in bearings G 43 of the yoke G 44, the latter is fastened to the lower end of a vertical shaft G 45 adapted to reciprocate through the bearing G 46 of the carriage body G 47. The latter is provided with wheels G 48 which run in the channel ways G 49, bolted to the frame K 3 and are parallel to the platens A 1 on the table A, in addition, the wheels G 50, rotatably mounted on the vertical pins G 51 riveted to the arms G 52 of the carriage G 47 run against the inner vertical faces of the channels G 49 and are adapted to reduce to a minimum friction due to any transverse lateral pressure of the carriage G 47 against one or both of said channels, due either to skewing of the carriage or direct pressure against one channel. The carriage G 47 is reciprocated from the cam G 53 through a train of mechanism comprising the following; the cam roller G 54 rotatably mounted on the cam lever G 55, the fork stud G 56, the fork block G 57, the fork G 58, the right and left hand threaded link rod G 71 connecting the fork G 58 with the fork G 59, the fork block G 60, pivotally mounted on the lower lever G 61 which is in turn keyed to the lower end of the hollow shaft G 62, adapted to oscillate in the bearings G 63 and G 64; the upper lever G 65 keyed to the upper end of the hollow shaft G 62 pivotally connected to the carriage G 47 by the link G 66, the latter, Fig. 30, fitting about a loose collar G 67, slightly higher than its own thickness, adapted to support the swivel head G 68, carried on the hollow spindle G 69 and held by the set-collar G 70, and to relieve the link G 66 from any pressure. The train of mechanism is similar to that used for both the suction heads and for the slide lever, the oscillation of the cam lever G 55 oscillates the vertical hollow shaft G 62 which in turn through the lever G 65 reciprocates the carriage G 47. Adjusting the fork stud G 56 changes the length of the path of carriage reciprocation, while adjusting the link rod, by turning it, changes the position of the path of reciprocation.

The vertical reciprocation of the transfer roll G 40 is effected by a cam G 72 and a train of mechanism comprising the following; the cam roller G 73 rotatably mounted on the cam lever G 74 pivotally mounted at G 75 on the base stand G 76; the said cam lever G 74 pivotally connected by the link G 77 to the bell crank lever G 78, the latter pivotally mounted at G 79 and adapted to raise or lower the push rod G 80 which passes through and is supported by the hollow shaft G 62; the top of the push rod G 80 engaging the point of the adjusting screw G 82 in the lever G 83 which is keyed fast to the oscillator shaft G 84 the latter being supported in the bearings G 85, on the swivel collar G 111, at one end and extending into the oscillator tube G 86 at the other, the oscillator tube having a slot G 90 in its under side between the arms G 87 which are pinned to the said tube; a rod G 88 connecting the two bars G 87 and a lever G 89 fastened into the oscillator rod G 84, passing through the slot G 90 and contacting with the rod G 88; the other end of said oscillator tube being supported in the bearings G 91 and carrying the lever G 92 which passes through a slot G 139 in the vertical shaft G 45 the latter carrying at its lower end the transfer roll yoke G 44; together with the swivel head G 68 which is provided with a yoke G 93 and an adjusting screw G 94 which engages a washer G 95 on top of a compression spring G 96 in the tube G 97 which is fast to the top of the vertical shaft G 45. A spring G 109 encircling the push rod G 80, between the lever G 61 and the pin G 110 keeps the said push rod at all times in contact with the lever G 78 and incidentally the cam roller G 73 in contact with the face of the cam G 72.

Depending from one of the channel ways G 49 is a bracket G 100 carrying a rack G 101 with which the transfer roll gear G 42 meshes during a part of the reciprocation of the carriage G 47.

In operation, at the beginning of a cycle, the carriage G 47 is at its outermost position, determined by the adjusting screw G 98 locked by the nut G 99 incidentally the length of the path of reciprocation of said carriage may be changed by adjusting the fork block stud G 56 and the position of the path of reciprocation by adjusting the link rod G 71 in the forks G 58 and G 59. The gear G 42 meshing with the gear G 39 rotates the transfer roll G 40, which is positioned at G 102, for best results, by the adjusting screw G 98, and positively rolling in contact with, and at the same speed of rotation as the glue coated surface of the feed roll G 32 is in turn coated with glue. On the inward motion of the carriage G 47 the transfer roll G 40 drops and comes into contact with a label on the platen A 1, opposite station 2, at about its middle, (see diagram of path of centre of transfer roll as shown in Fig. 38), rolls out beyond the end of said label and coats the inner half of said label with glue. The transfer roll then is raised and the gear G 42 at G 102 meshes with the rack G 101 and continues the rotation of the transfer roll so that when the carriage on its outward motion is over the centre of the label again the transfer roll will again be dropped into contact with the label, presenting the part of its surface, that has not been denuded of its glue coating, to the label as it rolls over it and coats the outer half. To reiterate the path of the centre of the transfer roll is indicated as G 103 the transfer roll G 40 rolling in contact with feed roll G 32, then in direction of arrows, inwardly to G 104, then dropped to G 105, continuing inwardly, in contact with said label, to G 106, then raised to G 102 then outwardly to G 107 then dropped to G 105 then continuing outwardly, in contact with said label, to G 108 and finally raised again to G 103 ready for a new cycle.

There is a most important advantage in coating a label as shown and described, from the centre toward the edge in opposite directions, since it eliminates the possibility of the edge of the label being picked up and the label rolled around the transfer roll.

The adjusting screw G 82 determines the level of the path of the centre of the transfer roll G 40 which in practice is such that its lower periphery is somewhat lower than the level of the platen A 1; the setting of the screw G 94 against the spring G 96 determines the pressure at which the transfer roll rolls over the label, in order to leave a uniform coating of glue on said label.

A combined manual and magnetic lock, Figs. 31 and 32, is provided to prevent the transfer roll G 40 from rolling in contact with, and gumming up, a platen A 1 should the suction head E 18 fail to place a label on the platen A 1 at station 1. The swivel collar G 111 swings about the shaft G 62 between the hub of the lever G 65 and the set-collar G 112. Pivotally mounted at G 114 on said swivel collar is a lever G 113 provided at its upper end with a pawl G 115 adjustable by means of the two screws G 116. The latch G 117 pivotally mounted on the pin G 118 is adapted to engage the lever G 113 in either of the steps G 119 and G 120. Fig. 31 shows the lever G 83 depressed, which corresponds with the position of the transfer roll G 40 when rolling in contact with a label on a platen A 1, and the latch G 117 engaging the outer step G 119. Fig. 32 shows the lever G 83 raised, which corresponds with the position of the transfer roll G 40 when held up out of contact with a label on a platen. For manual operation the lever G 113 is simply pushed upwardly whereupon the pawl G 115 hooks over the lug G 122 the instant the lever G 83 is raised and the latch G 117 drops and engages the second step G 120, this prevents the pawl G 115 from releasing the lug G 122 and thus maintains the transfer roll out of contact with a platen A 1; lifting the latch G 117 releases the lug G 122 as the lever G 113 drops back and the latch again engages the outer step G 119 and is ready for a similar operation. For automatic operation an electro magnet G 123 is provided mounted on the swiven collar G 111 one of the leads G 124 is grounded to the machine frame, the other goes to a battery and then to the contact device shown in detail in Fig. 43. A body E 83 made of some insulating material such as rubber or fibre is screwed through the upper and lower walls of the suction head E 18. A metal contact rod E 84, provided with a pin E 85 adapted to slide in the slot E 86, slides freely within the body E 83; a light spring E 87 maintains the contact rod E 84 slightly below the lower surface of the suction head E 18 whenever it is not covered by a label. A lead E 88 attached to the spring E 87 is connected to the above mentioned battery.

Should the label platen E 13 gradually rise as the labels are extracted, until the supply is entirely exhausted then the contact rod E 84 would touch the platen E 13 and closing the circuit, would energize the electromagnet G 123 which in turn would pull the armature G 126 to itself, the pawl G 115 would hook over the lug G 122 and the latch G 117 would engage the inner step G 120 of the lever G 113 locking the lever G 83 and preventing the transfer roll from coming into contact with a platen A 1 at station 2, until the lever G 113 is manually released by raising the latch G 117.

Another contingency is met in a similar way should a label fail to be extracted from the label magazine and delivered to the platen A 1 at station 1, then the contact rod E 84 would close the circuit by touching the said platen and the lever G 83 would be similarly locked until manually released.

An aural warning, to the operator, can also be given by including in the circuit a bell E 89 or similar device as shown in Fig. 43.

The centre of the platens A 1 being open, a sub-suction head G 127 is provided, shown in Figs. 7, 10, 13 and 16, actuated from the cam G 128 by the cam roller G 129, running in a race in the side of said cam, rotatably mounted on the bell crank lever G 130 pivotally mounted at G 131; the tube G 132, adapted to reciprocate vertically through the bearings G 133, carrying at its upper end the hollow sub-suction head G 127 having a perforated upper face, and at its lower end a clamp collar G 134 pivotally connected by the link G 135 to the bell crank lever G 130, and a tube G 136 connecting the tube G 132 to the suction valve J 4. In operation, immediately the table A comes to rest after bringing a label to station 2, the head G 127 rises through the opening in the table A and a platen A 1 and both supports the centre of said label, and assists in holding it in position by suction, while being coated with glue. The clamp collar G 134 provides for vertical adjustment of the head G 127.

The valves J 1, J 2, J 3 and J 4 Figs. 1, 5, 6, 10, 13 and 16 are similar; an air passage J 6, in the combined body of the valve J, is connected to the source of suction; the inlet J 7 is connected in each case to the particular device it serves. A cam, for example J 8, on the cam shaft J 9 actuates the plunger J 10 through the intermediary of a cam roller J 11 rotatably mounted on the bell crank lever J 12, pivotally mounted on the common shaft J 13, the other end of said bell crank lever extending through a slot J 14 in the plunger J 10 and engaging a roller J 15 rotatably mounted in the slot J 14. A spring J 17 encircles the plunger J 10 and, acting between the bearing J 18 and the washer J 16 supported on the roller pin J 19, tends to keep the valve closed by pushing the plunger J 10 against its seat J 20. Fig. 5 shows the valve closed; Fig. 6 shows it open with free opening between the passage J 6 and the inlet J 7. In a closed tube, D 43 for example, and suction head D 35 for example, if a partial vacuum has been created, and there is little air leakage, the suction persists even after the valve is closed so that a blank held to the face of the suction head would not be released until leakage of air filled the partial vacuum; this is inimical to smooth operation so a by pass J 21 is provided which, when the valve is closed, opens the tube J 7 to the atmosphere through the opening J 22.

The cams that operate the devices that perform the work of covering the box are carried on the vertical cam shaft F 2, rotating in the bearings F 5, F 6 and F 7, Figs. 1, 7, 10, and 16.

The stripper plunger F 8, Fig. 64, is carried at the lower end of the stripper rod F 9 which telescopes into the plunger tube F 10, and reciprocates through the bearing F 17, and carries at its lower end the plunger F 11. The tube F 10 telescopes into the top plunger tube F 12 which carries at its lower end the top plunger F 13. The tube F 12 telescopes into the end clamp tube F 14 which carries at its lower end the end clamp head F 15 and the end clamp fingers F 16. The tube F 14 telescopes into the side clamp tube F 18, which reciprocates through the bearing F 19, and carries at its lower end the side clamp head F 20 and the side clamp fingers F 21. The stripper plunger F 8 fits into a recess F 22 in the bottom of the plunger F 11 Fig. 64 so that the lower faces of the two plungers are in the same plane when the box is being made. The external dimensions of the plungers F 11 and F 13 are slightly smaller than the inside dimensions of the finished box. Holes F 23 are provided in the plungers F 11 and F 13 to allow air to enter the finished box, without creating a suction, when the plungers are withdrawn.

Figures 16, 17, 18, 19:
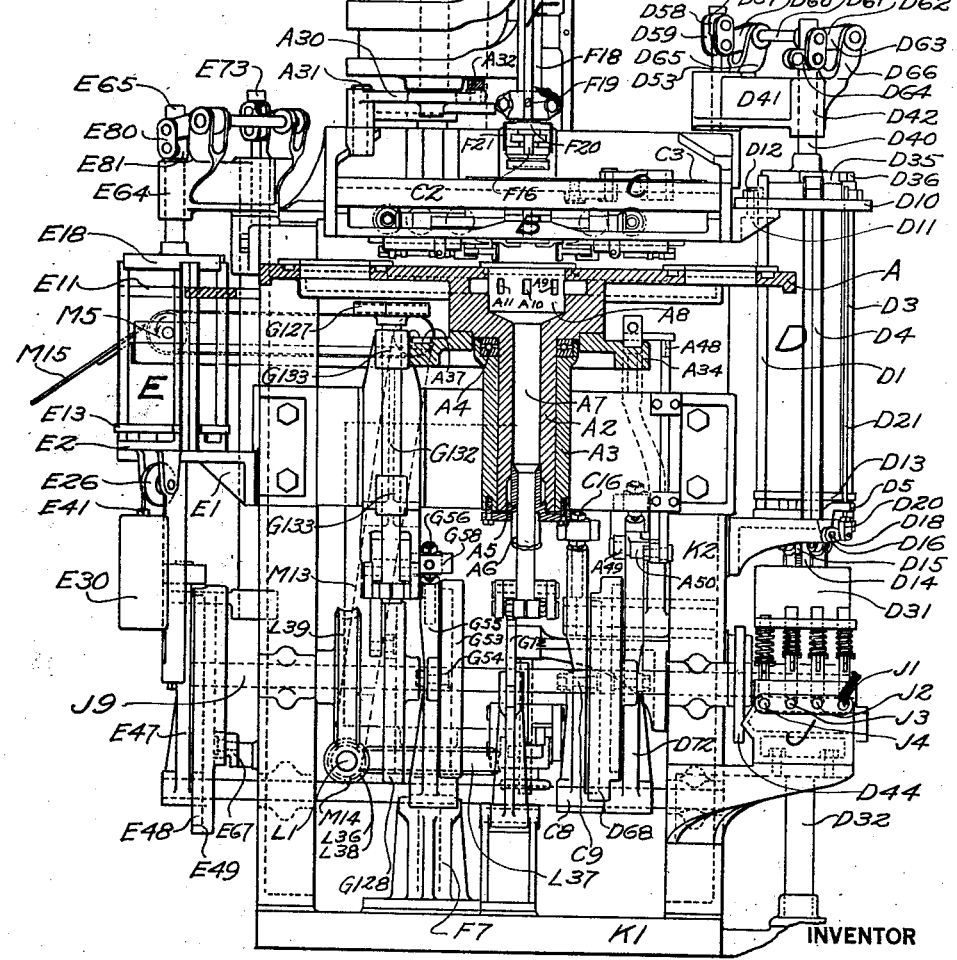
Fig. 16 is a front part sectional elevation of the machine.
Fig. 17 is a plan view of the adjustable tube clamp.
Fig. 18 is a side elevation of the adjustable tube clamp.
Fig. 19 is a plan view of the tube clamp.
Figure 28:
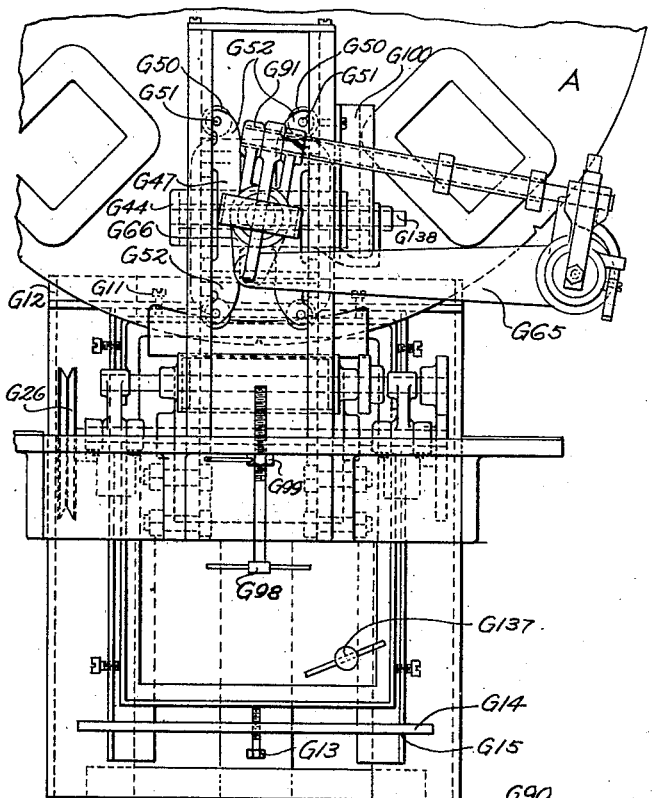
Fig. 28 is a plan view of the gluing mechanism.
Figure 29:
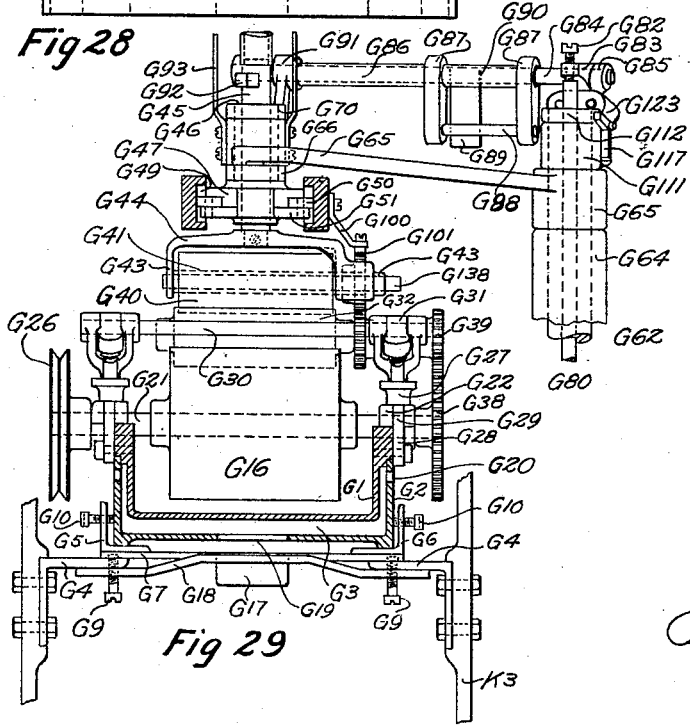
Fig. 29 is an end part sectional elevation of the gluing mechanism.
Figure 30:
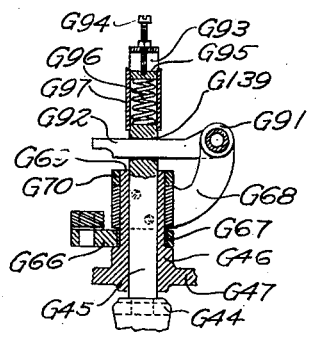
Fig. 30 is a sectional elevation of the glue roll lifting mechanism.

Each of the above described telescoping tubes and the stripper rod are actuated from the raceways of the barrel cam F 23. A split compression clamp F 24, similar to that shown in Fig. 19, is attached near the upper end of the stripper rod F 9; the two arms F 25 slidably engage the fixed guide bar F 26 and prevent rotation, on its vertical axis, of the stripper rod F 9 and incidentally the stripper plunger F 8. Mounted on the pins F 26 are the safety links F 27, shown in detail in Figs. 2, 3, and 4, also pivotally connected to the end of the cam lever F 28, which is pivotally mounted on the pin F 29 carried in the frame K 5. A cam roller F 30 rotatably mounted on the cam lever F 28 runs in the raceway F 31 and oscillates the said lever, incidentally the stripper rod F 9. The safety link is provided to eliminate danger of breakage should a greater thickness of cardboard, than is intended, get between the lower face of the stripper plunger F 8 and the upper face of the sub-plunger H 1; the bearing for the pin F 26 in the link F 27 is split, the little cap F 32 is adapted to slide within the opening F 33 in the link F 27 and is held within the link by the boss F 34 on one side and the head F 35 of the pin F 26 on the other. The compression spring F 36 holds the cap F 32 firmly in position, except when any excess pressure causes it to compress. The pins F 26 are held by the set screws F 37 and the pins F 38 are held by the set screws F 39.

In a similar way a split clamp F 40 is attached to the upper end of the plunger tube F 10 and pivotally connected by a similar safety link F 41 to the cam lever F 42 pivotally mounted on the pin F 43 and oscillated by a cam roller F 44 running in the raceway F 45.

The top plunger F 13, requiring at times a finer adjustment about its vertical axis, the split clamp F 46, Figs. 17 and 18 in detail, is provided with two arms F 47 with a clearance between them and the guide bar F 26, two screws F 48 provided with lock nuts threaded through the arms F 47 may be adjusted to make the finer axial setting of the top plunger tube F 12 and at the same time sliding in contact with the guide bar F 26 prevent rotation of the top plunger F 13 about its vertical axis. The top plunger tube is vertically reciprocated through a mechanism similar to that of the plunger F 11, the split clamp F 46 is pivotally connected to the cam lever F 49 by the safety links F 50. The cam lever F 49 is pivotally mounted on the pin F 51 carried in a slot F 54 in in the frame K 5, and provided with a cam roller F 52 running in the raceway F 53 and rotatably mounted on said cam lever F 49.

It is important that the reentrance of the top plunger F 13, Fig. 62, driving the edges H 15 of the label down into the box be timed very exactly. This is accomplished by changing the position of the pivotal pin F 51 relative to the cam raceway F 53, the said pivotal pin being carried in the slot F 54 may be adjusted either to the right or left, Fig. 7, by means of the screws F 55 which pass through the lugs F 56 and are threaded through the ends of the pin F 51 and locked to a setting by the lock nuts F 57. The cam F 23 revolves in the direction indicated by the arrow; adjusting the pin F 51 to the right also moves the cam roller F 52 to the right, and thus advances the cycle of motion of the plunger F 13 relative to all other motions governed by the cam F 23, and vice versa adjusting the pin 51 to the left retards the cycle of motion.

Both the clamp tubes F 14 and F 18 are equipped with split clamp collars F 58 and F 59 respectively and pivotally connected by the plain links F 60 and F 61 respectively to the cam levers F 62 and F 63 respectively; the latter are pivotally mounted on the pins F 64 and F 65 respectively and provided with cam rollers F 66 and F 67 respectively which run in the races F 68 and F 69 respectively.

The sub-plunger H 1 is usually provided with an upper surface H 2 of felt, rubber or some resilient material, although it may be operated with the metal plunger alone. The sub-plunger is carried at the top of the sub-plunger rod H 2 which reciprocates through the bearing H 4 and which also telescopes into the side riser tube H 3 and carries at its upper end the side riser head H 5 and side risers H 6. The tube H 3 telescopes into the end riser tube H 7, which reciprocates through the bearing H 8, and carries at its upper end the end riser head H 9 and end risers H 10.

The side and end risers H 6 and H 10 are each loosely riveted to their respective heads at H 11 and H 12 respectively. They are each adjustable inwardly from their respective heads by the set screws H 13 and H 14 respectively. This adjustment provides means for setting the risers, Fig. 59, so that they are close enough, when they push the sides of the label H 15, up against the box blank, to cause the label to adhere both strongly and smoothly.

A cam roller H 38, Fig. 51, running in the raceway H 16 of the cam F 3, rotatably mounted on the cam lever H 17 is pivotally connected by the links H 18 to the nut yoke, H 19 shown in detail in Fig. 52. The adjusting nut H 20 is placed within the nut yoke H 19 the latter having clearance holes to pass the rod H 2 and screwed up on same to any desirable position and then locked by the hand lock nut H 21; thus when the cam lever H 17 is oscillated the rod H 2 also reciprocates vertically. The adjustment provided enables the setting of the sub-plunger H 1 so that at the top of its stroke, its relation to the surface of the platen A 1 or to the turn-in fingers B 2 may be varied at will. Depending on the thickness or stiffness of the label H 15 see Fig. 62, the distance of the top edges of the box F 70 below the under side of the turn-in fingers F 53, varies, the thinner or more pliable the label the less this distance may be.

Depending from the bearing H 4 is the guide the rod H 22; fastened to the rod H 2 by a set screw H 23 is the guide arm H 24, the end is forked and engages the guide rod H 22 so that when the sub-plunger rod H 2 and sub-plunger H 1 reciprocate they are prevented from turning about their vertical axes since the guide arm H 24 is positioned between and engages the two lugs H 25 on the upper part of the nut yoke H 19. The sub-plunger H 1 is of approximately the same external lateral dimensions as the outside of the box made and since the risers H 6 and H 10 are always in sliding contact with the lateral faces of said sub-plunger they are preserved in the same relation thereto whenever, for any reason, the axial position of the sub-plunger may be changed.

The riser tubes H 3 and H 7 are each reciprocated by a similar mechanism, i. e., cam rollers H 26 and H 27 respectively, running in their respective races, H 28 and H 29 in the cam F 3, and rotatably mounted on the cam levers H 30 and H 31, respectively, the latter pivotally mounted on the pins H 32 and H 33 respectively. Split clamp collars H 34 and H 35, allowing for vertical adjustment of said riser tubes, are carried on the lower ends of tubes H 3 and H 7, respectively, and pivotally connected by the links H 36 and H 37, respectively, to the cam levers H 30 and H 31 respectively.

The folder frame B carries the mechanism adapted to turn the upstanding edges of the label H 15, Figs. 61, 62 and 63, over the top of the box, after which they are driven down and against the inner faces of the box by the plunger, and then to squeeze these downturned edges, under pressure, firmly against the inner faces of the box to insure positive adhesion of the label to the box. The folder frame and parts are shown in Figs. 7, 10, 16, 20 to 27 A, 49, 92 A and 58 to 64.

The two side folders B 2 are similar and each slides in contact with the under side of the frame B 3 and is superposed on the corner folder slide B 4 both parts B 2 and B 4 are supported and slide in the guides B 5. The side folder B 2 has a rectangular opening B 6 into which is slidably fitted the centre block B 7 carrying the rack B 8. The two screws B 9 pass through holes in the folder B 2 and are threaded into the block B 7; the screw B 10 is threaded through the folder B 2 and butts against the block B 7. This device provides means for adjusting the edge B 11 relatively to the rack B 8.

The end folders B 12 are similar to the side folders B 2 and are provided in the same way with a centre block B 13 a rack B 14, the block screws B 15 and the butt screw B 16 and slide in contact with the under side of the frame B 3 and in the guides B 17.

Each corner folder slide B 4 has two arms B 18 on which are pivotally mounted the corner folders B 19. A rack B 20 is mounted on the top of the corner folder slide B 4 and passes through the slot B 211 of the side folder B 2. Pins B 21 pass through the slots B 22 in the yoke B 23 and are riveted into the ends of the corner folders B 19.

Pinned to the friction rod B 24 which is provided with a hexagonal head B 25 and is threaded into the yoke B 23, is a collar B 26. Between the collar B 26 and the head B 25 the rod B 24 is slidably mounted in the bearing B 27 on the under side of the corner folder slide B 4. A flat spring B 28 mounted on the slide B 4 is always in contact with the head B 25 and maintains any setting of the rod B 24. On each side of the rod B 24 are two friction devices; in a pocket B 29, part of the guide B 5, is a hollow plunger B 30, in the head B 31, of which, is fastened a block of leather or similar material B 32. These two blocks of leather B 32, Figs. 22 and 27, are held in frictional contact with the rod B 24 by the compression springs B 33 in the pockets B 29 and the pressure of contact is regulated by the adjusting screws B 34.

Engaging the teeth of the rack B 8 is the gear B 35 mounted on the shaft B 36 carried in the bearings B 37 and B 38. This shaft B 36 is oscillated by the mechanism shown in detail in Figs. 49 and 49 A. A cam roller B 39 rotatably mounted on the cam lever B 40 runs in the raceway B 41 of the cam F 71. The rack rod B 42 is threaded into the rod end B 43 which provides adjustment of the rack relative to the pin B 44, and locked by the nut B 45. The cam lever B 40 is pivotally mounted on the pin B 46 threaded into the frame bracket K 6. As the cam causes an oscillation of the lever B 40 the rack rod is vertically reciprocated and since it engages the segment of a gear B 47 it causes the shaft B 36 to oscillate whereupon the gear B 35 keyed to said shaft and in mesh with the rack B 8 effects the reciprocation of the slide B 2. The companion slide B 48 is synchronously reciprocated by the train of mechanism comprising the bevel gear B 49, on the end of the shaft B 36, meshing with the bevel gear B 50 on the end of the shaft B 51 carried in the bearings B 52. At the other end of said shaft B 51 another bevel gear B 53 meshes with the bevel gear B 54 pinned to the end of the shaft B 55 carried in the bearings B 56. Keyed to the shaft B 55 is the spur gear B 58 meshing with the rack B 59 so that the two slides move toward or away from each other simultaneously. The rack B 60 on the rack rod B 42 is maintained in mesh with the gear segment B 47 by the rollers B 61 rotatably mounted between the sides of the rack retainer B 62 which hangs on the shaft B 36; these rollers B 61 also reduce friction as the smooth back of the rack B 60 runs over them.

The end folders B 12 are reciprocated through a similar mechanism, the cam roller B 63, running in the raceway B 64, and rotatably mounted on the cam lever B 65, the latter pivotally mounted on the frame bracket K 6 by the pin B 66. The rack rod B 67 is pivotally connected, through the rod end B 68 to the cam lever B 65, the other end being the rack B 69 engaging the segment of a gear B 70 keyed to the shaft B 71 carried in the bearings B 72; in this case two bevel gears B 73 and B 74 being mounted on the shaft B 71, a bevel gear B 75 on the end of the shaft B 76 reciprocates one folder through the spur gear B 77 and the rack B 78 and a bevel gear B 79 on the end of the shaft B 80 reciprocates the other end folder through the spur gear B 81 and the rack B 82.

The corner folder slide B 4 is also reciprocated by a similar mechanism. A cam roller B 83, running in the raceway B 84 is rotatably mounted on the cam lever B 85, the latter pivotally mounted on the frame bracket K 6 by the pin B 86. The rack rod B 87 is pivotally connected, through the rod end B 88 to the cam lever B 85; the other end being the rack B 89 engaging the segment of a gear B 90 keyed to the shaft B 91 carried in the bearings B 92; in this case a bevel gear B 93 being mounted on the shaft B 91 meshes with the bevel gear B 108 mounted on the shaft B 94 carried in the bearings B 95 and at the other end of said shaft B 94 another bevel gear B 96 meshes with the bevel gear B 97 carried on the shaft B 98. Thus the spur gears B 99 and B 100 meshing with their respective racks B 101 and B 102 reciprocate the corner folder slides simultaneously toward or away from each other.

As the folder slide B 4 moves inwardly in the direction of the arrow, Figs. 22 and 25, the rod B 24, being held by friction between the leather blocks B 32, also restrains the movement of the yoke B 23 and through the pins B 21 causes the corner folders B 19 to swing on the pins B 103 into the dotted position B 104, Fig. 60; the corner folders are just ready to start folding the flaps B 105 of the label around the corners of the box. At this juncture the bearing B 27 reaches the collar B 26 on the rod B 24 and pushes the rod between the leather blocks B 32, against the friction developed, and the corner folders fold the flaps of the label around the corners of the box as shown in dotted position B 106. The position of the collar B 26 in relation to the slots B 22 in the yoke B 23 determines the shortest distance between the corner folders B 19 during a cycle, so that they can be very accurately adjusted, by the screw rod B 24, to exactly the proper distance apart which is determined by the overall length of the box. The pressure exerted by the corner folders in pressing the flaps against the end of the box to make them adhere, is determined by the friction developed between the leather blocks B 32 and the friction screw rod B 24 and is regulated by the adjusting screws B 34 against the springs B 33.

Another function of the friction blocks is to position the corner folders B 19 so that they are in alignment with the ends of the box when they fold the label flaps about the corners of the box; this is accomplished by the adjusting screws B 34; adjusting one B 34 inwardly toward the spring and the opposite one B 34' outwardly, Fig. 22, causes the arm B 107 to move away from the rod B 24 and the arm B 108 to move toward the rod B 24 or opposite screw adjustments cause opposite positional movements of the arms.

As the corner folder slide B 4 moves out on its return stroke it is necessary that the corner folders B 19 as shown in the dotted position B 106, Fig. 60 be immediately opened up away from the label flaps that have just been applied in order not to tear them off; the friction blocks B 32 come into play again immediately the slide B 4 starts moving out, and restraining the friction rod B 24, a reverse movement of the corner folders B 19 takes place; they swing on the pins B 103 again and open up to the position B 107 shown in dash lines, Fig. 60, at which moment the bearing B 27 reaches the head B 25 and the slide B 4 and arms B 19 move out in the same relative position to complete the cycle. The corner folders B 19 being held in position by friction makes for safety since in any jam of body blank and label the folders merely open up without damage.

In the making of a box the blank and the label go through the following operations.

The blank is abstracted from the blank magazine D and placed on the feed slide C 1 which positions it under the plunger F 11 and F 13, Fig. 55. The plunger descends and drives the blank into the bevel top opening C 26 in the slide C 1 to the initial position shown in Fig. 56, and then to an intermediate position shown in Fig. 57 when the plunger having folded the blank up closely to itself, momentarily halts, and the clamp fingers F 16 and F 21 descend and hold the folded blank to the plunger. Then the folded blank, plunger and clamp fingers all descend together through the opening C 26 in the slide C 1 as shown in Fig. 58. At this time the slide C 1 starts its return stroke; this could not be done since the lower portions of the telescoping tubes project down through the opening C 26 in the slide C 1, except that a slot C 27, Figs. 10 and 44, is provided wide enough to allow the passage of the telescoping tubes, F 18 being the outer one, through the slot as the slide returns to its initial position.

In the meantime the label that is to be wrapped around this particular blank has started six cycles previously, having been extracted from the label magazine E and placed on the platen A 1 at station 1, passing thence to station 2 as the table A rotates periodically where it is coated with glue by the adhesive applying device, then remaining passively on its platen A 1, through the stations 3, 4, 5 and 6, during which period there is time for the glue to dry and become tacky so that it will adhere readily when applied to the box. The next rotation brings it under the plunger at station 7 as shown in Fig. 58, where the sub-plunger H 1 is shown coming up to support the centre of the label and the plunger F 13 with the folded blank is shown descending ready to place the folded blank exactly centrally on the glue coated label.

In Fig. 59 the side risers H 6 are shown as having come up through the table A and the platen A 1 and pushed up and applied the sides of the label to the sides of the box.

In Fig. 60 the corner flaps B 105 of the label (also shown in Fig. 65) are being folded about the corners and against the end of the box after which the ends of the label are applied to the ends of the box by the end risers H 10 similarly to that of the side risers H 6.

In Fig. 61, the label has been entirely applied to the outer surface of the box and the edges of the label that remain projecting above the top of the box remain to be turned over and down into the box; the upper plunger F 13 has been withdrawn. The two side folders B 2 move in first, Figs. 20, 22, 60 and 61, and bend the edges of the label over the side top edges of the box, then the end folders B 12 move in, bending the end top edges of label over the end top edges of the box.

The upper plunger F 13 now descends, Fig. 62 while at the same time both the side folders B 2 and the end folders B 12 are withdrawn, and drives the bent over edges down into and against the inner faces of the sides of the box, Fig. 63. Immediately this is done the side risers H 6 and the end risers H 10 move up, projecting above the top of the box, and the side folders move in against the side risers H 6, and the end folders against the end risers H 10 and squeeze the sides of the box, under pressure, against the plunger F 13 causing the down turned edges of the label to adhere firmly to the inner surface of the box.

The complete box, Figs. 64 and 65, is ready to be discharged. The side and end folders are withdrawn, the box descends resting on the sub-plunger H 1 and still within the side risers H 6 and end risers H 10; while the plungers F 11 and F 13 are withdrawn upwardly the stripper plunger F 8 pushes the box from the withdrawing plungers and follows it down while the side and end risers drop below the top of the sub-plunger; the stripper plunger F 8 then withdraws upwardly into the recess in the bottom of the plunger F 11. A new cycle now starts; the table A makes a partial rotation and the air duct projection A 64 sweeps across the top of the sub-plunger in the direction of the arrow and pushes the completed box across the shelf M 1 onto the belt M 2 of the conveyor shown in Figs. 10, 16, 34 and 35. The shelf M 1 is carried on the bracket M 3 fastened to the frame bracket K 6. The shelf M 1 overlaps the belt M 2 which is carried on the two rollers M 4 and M 5 mounted on the shafts M 6 and M 7 mounted in the bearings M 8 and M 9 carried on the frame M 10 supported by the angles M 11 fastened to the frame K 7. The two bearings M 8 are adjustable to take up slack in the belt M 2. A V groove pulley M 12 is driven by a belt M 13 from a pulley M 14 on the shaft L 1. The belt conveyer delivers the box to the apron M 15 from which it drops into a container.

The machine is driven by a motor L 2 which drives the counter shaft L 3 by the belt L 4 to the pulley L 5. A pulley L 6 through a belt L 7 drives the pulley L 8 on the yoke shaft L 9. On the shaft L 9 which revolves in the bearings L 10 is the friction drive pulley L 11 between the bearings L 10. This is adapted to engage the face of the friction disk L 12 and may be moved longitudinally on the shaft L 9 to engage the face of the friction disk at different distances from its centre to vary the speed of the shaft L 1, revolving in the bearings L 13 and L 14. A thrust ball bearing L 15 in the end of the bearing L 13 takes the thrust pressure of the disk L 12.

In Fig. 50, the friction yoke L 16 is shown pivotally mounted on the shaft L 17 carried in the bearings L 18, which are fastened to the base K 1. Between the arms of the forked lever L 19 pivotally mounted on the frame K 7 at L 20 a triangular head L 21 is pivotally mounted at L 22, into one side of which is threaded the clutch rod L 23. The other end of the clutch rod passes through the block L 24, pivotally mounted between two lugs L 25 on the friction yoke L 16, and is subject to adjustment and locking thereto by the lock nuts L 26. The upper end of the head L 21 is pivotally connected by the link L 27 to the bell crank control lever L 28 pivotally mounted at L 29. The lower end of the head L 21 is pivotally connected by the link L 30 to the end of the lever L 31 which is keyed to the rocker rod L 32 carried in bearings L 33 on the frame K 7 and K 2; at the farther end of the rock shaft another lever similar to L 31 is keyed and pivotally connected by the link L 37 to a bell crank control lever L 35 similar to L 28. This arrangement permits control of the machine from two sides as shown in Fig. 10. The variable speed device of friction pulley L 11 and friction disk L 12 also serves as a clutch. The full lines Fig. 50 show the control lever L 28 locked in the running position with the clutch rod L 23 up and in contact with the hub of the lever L 19 since the centre of the pin L 22 in the lever L 19 is above the centre of the pin L 20. In this position the clutch rod L 23 is adjusted so that there is the necessary amount of pressure between the face of the friction pulley L 11 and that of the disk L 12 to ensure uniform rotation of the said disk with a minimum of slippage. The dotted lines show the stop position for the lever L 28 and connecting parts. The friction yoke L 16 drops away from the friction disk L 12 and the pulley L 11 shown in dotted line is no longer in contact with the face of the friction disk. For complete shut down an electric switch, not shown, controls the motor L 2.

A contact device D 90 in the blank suction head D 35 may be used in a way similar to that of the contact device E 82 in the label suction head E 18, to close a circuit, either if the blank magazine becomes exhausted, when contact would be made through the blank platen D 13, or should no blank be abstracted from the blank magazine whereupon contact would be made through the slide C 1, and throw out the solenoid motor switch not shown.

On the shaft L 1 is mounted a worm L 36 which drives the cam shaft F 2 through the worm gear L 37. Another worm L 38 on the same shaft L 1 drives the cam shaft J 9 through the worm gear L 39.

What I claim is,—

1. In an automatic box machine, in combination, a plunger, a feed slide provided with a central opening and a slot extending from said opening through the end of said slide adapted to allow the shank of a plunger to pass through said slot as said slide reciprocates in ways provided therefor.

2. In an automatic box machine, in combination, a plunger, a feed slide provided with a central opening and a slot extending from said opening through the end of said slide adapted to allow the shank of a plunger to pass through said slot as said slide reciprocates in ways provided therefor; said slide also provided with a suction duct surrounding said central opening with perforations through the upper face of said slide communicating with said duct.

3. In an automaitc box machine, in combination, a plunger, a feed slide provided with a central opening, the sides of said opening adapted to turn the sides of a blank up against said plunger which plunger is adapted to push said said blank through said slide.

4. In an automatic box machine, in combination, a plunger, a feed slide provided with a central opening, the sides of said opening adapted to turn the sides of a blank up against said plunger which plunger is adapted to push said blank thru said slide, and a slot extending from said opening thru the end of said slide adapted to allow the shank of said plunger to pass thru said slot as said slide reciprocates in ways provided therefor.

5. In an automatic box machine a gluing device comprising in combination a glue tank; a glue roller rotatably mounted in bearings carried by said tank; a feed roller rotatably mounted in bearings, said bearings pivotally mounted on the bearing caps of said glue roller; means to regulate the distance between the faces of said glue and said feed roller; a transfer roller rotatably mounted in a reciprocable yoke, said yoke carried in a vertical bearing in a transfer carriage, said transfer roller adapted to periodically run in contact with said feed roller together with means to drive said glue roller, means to drive said feed roller from said glue roller and means to drive said transfer roller, when in contact with said feed roller, from said feed roller.

6. In an automatic box machine a gluing device comprising in combination a glue tank, a glue roller, a feed roller, a transfer roller with bearings and supports and means for driving each of said rollers; a vertically reciprocable transfer yoke; a horizontally reciprocable transfer carriage provided with a bearing for said transfer roller yoke, also wheels on horizontal axes adapted to run in ways provided therefor, and wheels on vertical axes adapted to run against said ways to diminish lateral friction together with means to reciprocate said transfer yoke and said transfer carriage so that said transfer roller is moved into contact with said feed roller, obtains a coating of glue, is moved over the center of a label, held in a flat position by suitable means, dropped into contact with and rolled to the end of said label, is raised, and a gear provided on the end of the hollow shaft carrying said transfer roller is meshed with a rack provided and carried on said ways, continuing the rotation of said transfer roller during part of the return stroke of said carriage, dropped into contact with and rolled to the end of said label completing uniformly coating the entire face of said label with glue.

7. In an automatic box machine a gluing device comprising in combination the glue tank, the glue roller and the feed roller with supporting and operating parts; the carriage ways, the complete transfer carriage as described including the transfer roller and its yoke with means for vertically reciprocating the transfer roller and adjusting the length and position of the vertical path of said roller, the means for continuing the rotation of said transfer roller during part of its return stroke together with means for reciprocating said transfer carriage and means for adjusting the length and position of its path of horizontal reciprocation.

8. In an automatic machine a vertically reciprocating yoke rod and a device for suspending the downward stroke of said yoke rod carrying, at its lower end, the transfer roll yoke and roller comprising a yoke rod lever engaging a slot provided in said yoke rod, said lever keyed to a tubular shaft rotatably mounted; an oscillating shaft telescoping into and slidably engaging said tubular shaft; said oscillating shaft rotatably mounted in bearings; an oscillating lever keyed to said oscillating shaft; a lug projecting from the hub of said lever together with an adjustable pawl, pivotally mounted, adapted to engage said lug when said oscillating lever is raised.

9. In an automatic machine a vertically reciprocating yoke rod and a device for suspending the downward stroke of said yoke rod carrying at its lower end the transfer roll yoke and roller, comprising in combination a yoke rod lever engaging a slot provided in said yoke rod, said lever keyed to a tubular shaft rotatably mounted; an oscillating shaft telescoping into and slidably engaging, for rotation about its horizontal axis, said tubular shaft; said oscillating shaft rotatably mounted in bearings; an oscillating lever, with means to raise and lower same, keyed to said oscillating shaft; a lug projecting from the hub of said lever; an adjustable pawl, pivotally mounted, adapted to engage said lug by manual operation, when said oscillating lever is in its highest position together with a latch, pivotally mounted, adapted to engage and lock said pawl when in engagement with said lug, and a step in said pawl adapted to engage said latch and hold it inoperative when said pawl is not in engagement with said lug.

10. In an automatic machine a vertically reciprocating yoke rod and a device for suspending the downward stroke of said yoke rod and carrying at its lower end the transfer roll yoke and roller, comprising in combination a yoke rod lever engaging a slot provided in said yoke rod, said lever keyed to a tubular shaft rotatably mounted; an oscillating shaft telescoping into and slidably engaging, for rotation about its horizontal axes, said tubular shaft; said oscillating shaft rotatably mounted in bearings; an oscillating lever, with means to raise and lower same, keyed to said oscillating shaft; a lug projecting from the hub of said lever; an adjustable pawl provided with an armature pivotally mounted, adapted to engage said lug by the action of an electro-magnet mounted adjacent to said pawl and adapted to actuate said pawl, when energized, by attracting said armature, when said oscillating lever is in its highest position together with a latch, pivotally mounted, adapted to engage and lock said pawl when in engagement with said lug, and a step in said pawl adapted to engage said latch and hold it inoperative when said pawl is not in engagement with said lug.

11. In an automatic machine a vertically reciprocating yoke rod and a device for suspending the downward stroke of said yoke rod carrying at its lower end the transfer roll yoke and roller, comprising in combination a yoke rod lever engaging a slot provided in said yoke rod, said lever keyed to a tubular shaft rotatably mounted; an oscillating shaft telescoping into and slidably engaging, for rotation about its horizontal axes, said tubular shaft; said oscillating shaft rotatably mounted in bearings; an oscillating lever, with means to raise and lower same, keyed to said oscillating shaft; a lug projecting from the hub of said lever; an adjustable pawl provided with an armature pivotally mounted, adapted to engage said lug by the action of an electro-magnet mounted adjacent to said pawl and adapted to actuate said pawl, when energized, by attracting said armature when said oscillating lever is in its highest position together with a latch, pivotally mounted, adapted to engage and lock said pawl when in engagement with said lug, and a step in said pawl adapted to engage said latch and hold it inoperative when said pawl is not in engagement with said lug, also means to regulate the position of the edge of said pawl in relation to the edge of said lug.

12. In an automatic box machine the combination of a rotary table provided with a plurality of suction platens each slightly smaller than a label adapted to be held flat upon the face of said platen; an opening provided thru the center of each of said platens and the said table and a sub-perforated suction head below said table adapted to rise thru one of said openings and support the center of a label upon the particular platen over said sub-suction head together with a glue roller adapted to roll over, and coat with adhesive, said label supported by said subperforated platen.

13. In an automatic box machine the combination of a rotary table provided with a plurality of suction platens each slightly smaller than a label adapted to be held flat upon the face of said platen; an opening provided thru the center of each of said platens and the said table and a subperforated suction head below said table adapted to rise thru one of said openings and support the center of a label upon the particular platen over said sub-suction head, together with the gluing mechanism as shown and described adapted to coat a label, held on such platen as is positioned in juxtaposition to said gluing mechanism, in the manner described.

14. In an automatic box machine the combination of a rotary table provided with a plurality of suction platens each slightly smaller than a label adapted to be held fast upon the face of said platen; an opening provided thru the center of each of said platens and the said table and a subperforated suction head below said table adapted to rise thru one of said openings and support the center of a label upon the particular platen over said sub-suction head, together with the gluing mechanism, as shown and described, adapted to coat a label held on such platen, as is positioned in juxtaposition to said gluing mechanism, in the manner described, and the device for withholding the transfer roller from contact with said label.

15. In an automatic box machine the combination of a rotary table provided with a plurality of suction label platens with an opening thru each of said platens and said table; the label magazine and means to extract, convey and deliver a label to each in sequence of such label platens as are positioned at said label magazine station; the gluing device described adapted to coat each label, in sequence as said rotary table presents them for coating with glue, together with the sub suction head adapted to support the center of a label and means to operate said rotary table, suction label magazines, label extracting and conveying device, gluing device, and sub suction head.

16. In an automatic box machine the combination of a rotary table provided with a plurality of suction label platens with an opening thru each of said platens and said table; the label magazine and means to extract, convey and deliver a label to each in sequence of such label platens as are positioned at said label magazine station; the electrical contact device carried by the label suction head of said label extracting means; the gluing device described adapted to coat each label in sequence as said rotary table presents them for coating with glue the device for withholding the transfer roller of said gluing device from coating an uncovered platen with glue, together with the sub suction head adapted to support the center of a label and means to operate said rotary table, suction, label magazine, label extracting and conveying, gluing device and sub-suction head.

17. In an automatic box machine the combination of a rotary table provided with a plurality of suction platens; an opening thru each of said platens and said table adapted to pass a plunger; a platen suction duct surrounding each of said openings in said table; perforations in each said platen communicating with the respective suction duct of each said platen; a valve suction duct connecting each platen suction duct to a central suction chamber; a valve in each valve suction duct to control the amount of air suction to its respective suction platen together with a valve in the central suction chamber adapted to always maintain the suction platen, positioned between the box forming station and the label magazine station, closed to suction, and the suction platen positioned at the box forming station closed to suction after the label is removed from said platen, and the suction platen positioned at the label magazine station closed to suction until a label is placed upon it.

18. In an automatic box machine the combination of a rotary table provided with a plurality of suction platens; an opening thru each of said platens and said table adapted to pass a plunger; a platen suction duct surrounding each of said openings in said table; perforations in each said platen communicating with the respective suction duct of each said platen; a valve suction duct connecting each platen suction duct to a central suction chamber; a valve in each valve suction duct to control the amount of air suction to its respective suction platen together with a valve in the central suction chamber adapted to always maintain the suction platen, positioned between the box forming station and the label magazine station, closed to suction, and the suction platen positioned at the box forming station closed to suction after the label is removed from said platen, and the suction plate positioned at the label magazine station closed to suction until a label is placed upon it, including means to operate said central valve and means to operate said rotary table.

19. In an automatic box machine the rotary table and the device for operating said table comprising in combination, a vertical hollow sleeve depending from said table, rotatably mounted in a vertical bearing, provided at its upper end with a ball bearing to support the weight of said table; a flange projecting from said depending sleeve provided in its upper face with a plurality of vertical cylindrical holes each at the apex of a regular polygon, and each hole connected, by a shallow groove of the same width as the diameter of said hole, to the next adjacent hole; a pawl adapted to rotatably fit and to drop into said holes, also to slide, thru said grooves, from one hole to another; said pawl adjustably carried on the end of an arm, said arm pivotally mounted by a fork, pins and block on a stud adjustable in one end of a pivotally mounted bell crank lever, the other end provided with a pivotally mounted cam roller running in a cam race way together with a vertically reciprocable tee head push rod and bearings therefor, a lever pivotally mounted engaging said push rod at one end and equipped with a pivotally mounted cam roller at the other end and a suitable cam to engage said cam roller, said tee head push rod adapted to lift said pawl out of one of said holes, after the completion of the forward stroke of said pawl, so that on its return stroke said pawl may slide thru and be guided by said shallow groove to the next of said holes whereupon said tee head push rod drops allowing said pawl to drop into said next hole.

20. In an automatic box machine the combination of a rotary table provided with a plurality of suction platens; an opening thru each of said platens and said table adapted to pass a plunger; a platen suction duct surrounding each of said openings in said table; perforations in each said platen communicating with the respective suction duct of each said platen; a valve suction duct connecting each platen suction duct to a central suction chamber; a valve in each valve suction duct to control the amount of air suction to its respective suction platen together with a valve in the central suction chamber adapted to always maintain the suction platen, positioned between the box forming station and the label magazine station, closed to suction, and the suction platen positioned at the box forming station closed to suction after the label is removed from said platen, and the suction platen positioned at the label magazine station closed to suction until a label is placed upon it, including means to operate said central valve and means to operate said rotary table comprising in combination, a vertical hollow sleeve depending from said table, rotatably mounted in a vertical bearing, provided at its upper end with a ball bearing to support the weight of said table; a flange projecting from said depending sleeve provided in its upper face with a plurality of vertical cylindrical holes each at the apex of a regular polygon, and each hole connected, by a shallow groove, of the same width as the diameter of said hole, to the next adjacent hole; a pawl adapted to rotatably fit and to drop into said holes, also to slide thru said grooves, from one hole to another; said pawl adjustably carried on the end of an arm, said arm pivotally mounted by a fork, pins and block on a stud adjustable in one end of a pivotally mounted bell crank lever, the other end provided with a pivotally mounted cam roller running in a cam race way together with a vertically reciprocable tee head push rod and bearings therefor, a lever pivotally mounted engaging said push rod at one end and equipped with a pivotally mounted cam roller at the other end and a suitable cam to engage said cam roller, said tee head push rod adapted to lift said pawl out of one of said holes, after the completion of the forward stroke of said pawl, so that on its return stroke said pawl may slide thru and be guided by said shallow groove to the next of said holes whereupon said tee head push rod, drops allowing said pawl to drop into said next hole.

21. In an automatic box machine the combination of a rotary table provided with a plurality of suction platens; an opening thru each of said platens and said table adapted to allow a plunger to pass thru; a platen suction duct surrounding each of said openings in said table; perforations in each said platen communicating with the respective suction duct of each said platen; a valve suction duct connecting each platen suction duct to a central suction chamber; a valve in the central suction chamber adapted to always maintain the suction platen, positioned between the box forming station and the label magazine station, closed to suction, and the suction platen positioned at the box forming station closed to suction after the label is removed from said platen, and the suction platen positioned at the label magazine station closed to suction until a label is placed upon it; said central valve and operating means comprising a body provided with symmetrically disposed openings in its lower face each connected by a passage to one of said valve suction ducts; a flat circular valve, mounted at the lower end of a valve shaft rotatably mounted in said valve body; a spring mounted between said valve body and a ball bearing provided under a valve lever keyed to the top of said valve shaft, adapted to maintain said valve in contact with the under side of said valve body; said flat valve provided with openings so that the remaining solid sector can always be positioned to close two of said symmetrically disposed openings, together with a link pivotally connected at one end to said valve lever and at the other to a pivotally mounted cam lever, a cam roller rotatably mounted on said cam lever held in contact with the peripheral face of a cam by a spring acting upon said valve lever all as shown and described.

22. In an organized automatic box machine the combination of the label magazine, the label extracting and conveying device; the rotary table and air suction platens; the central air suction control valve together with the glue applying device, the electrical contact device and the device for preventing the application of glue to a platen uncovered by a label and means for operating all of said devices.

23. In an automatic box machine the combination of a box forming plunger carried on the lower end of one of a plurality of vertically reciprocable telescoping tubes and a feed slide provided with an opening thru which said plunger may pass, together with means to hold a blank centrally over said opening.

24. In an automatic box machine the combination of a box forming plunger carried on the lower end of one of a plurality of vertically reciprocable telescoping tubes together with a feed slide provided with an opening and means to hold a blank centrally over said opening; said plunger adapted to fold said blank up about itself by driving said blank downwardly thru said opening, when said opening is positioned under said plunger.

25. In an automatic box machine the combination of a box forming plunger carried on the lower end of one of a plurality of vertically reciprocable telescoping tubes; another of said tubes provided with end clamps and still another with side clamps, together with a feed slide provided with an opening and means to hold a blank centrally over said opening; said plunger adapted to fold said blank up about itself by driving said blank downwardly thru said opening, when said opening is positioned under said plunger, said end clamps and said side clamps adapted to slip over the sides of said folded blank, while said plunger and blank is passing thru the opening in said slide, and hold said folded blank on said plunger.

26. In an automatic box machine the combination of a composite plunger comprising a lower stripper plunger a middle plunger and a top plunger, said stripper plunger carried on the lower end of a stripper rod said stripper rod telescoping into a middle tube provided on the lower end with the middle plunger, said middle tube telescoping into a top tube provided on the lower end with the top plunger together with a feed slide provided with an opening and means to hold a blank centrally over said opening, said composite plunger adapted to act as a single plunger to fold said blank up about itself by driving said blank downwardly thru said opening when said opening is positioned under said plunger.

27. In an automatic box machine the combination of a composite plunger comprising a lower stripper plunger a middle plunger and a top plunger said stripper plunger carried on the lower end of a stripper rod said stripper rod telescoping into a middle tube provided on the lower end with the middle plunger, said middle tube telescoping into a top tube provided at the lower end with the top plunger; a side clamp tube telescoping over said top tube and provided at its lower end with side clamps; an end clamp tube telescoping over said side clamp tube and provided at its lower end with end clamps together with a feed slide provided with an opening and means to hold a blank centrally over said opening, said composite plunger adapted to act as a single plunger to fold said blank up about itself by driving said blank downwardly thru said opening when said opening is positioned under said plunger, said end clamps and side clamps adapted to slip over the sides of said folded blank, while said composite plunger and blank is passing thru the opening in said slide, and hold said folded blank on said plunger.

28. In an automatic box machine the combination of a composite plunger comprising a lower stripper plunger a middle plunger and a top plunger said stripper plunger carried on the lower end of a stripper rod said stripper rod telescoping into a middle tube provided on the lower end with the middle plunger, said middle tube telescoping into a top tube provided at the lower end with the top plunger; a side clamp tube telescoping over said top tube and provided at its lower end with side clamps, an end clamp tube telescoping over said side clamp tube and provided at its lower end with end clamps together with a feed slide provided with an opening and means to hold a blank centrally over said opening, said composite plunger adapted to act as a single plunger to fold said blank up about itself by driving said blank downwardly thru said opening when said opening is positioned under said plunger, said end clamps and side clamps adapted to slip over the sides of said folded blank, while said composite plunger and blank is passing thru the opening in said slide, and hold said folded blank on said plunger, also means to support and to reciprocate said stripper rod, telescoping tubes and feed slide.

29. In an automatic box machine the combination of a composite plunger comprising a lower stripper plunger, a middle plunger and a top plunger said stripper plunger carried on the lower end of a stripper rod said stripper rod telescoping into a middle tube provided on the lower end with the middle plunger, said middle tube telescoping into a top tube provided in the lower end with the top plunger; a side clamp tube telescoping over said top tube and provided at its lower end with side clamps, an end clamp tube telescoping over said side clamp tube and provided at its lower end with end clamps together with a feed slide provided with an opening and means to hold a blank centrally over said opening, said composite plunger adapted to act as a single plunger to fold said blank up about itself by driving said blank downwardly thru said opening when said opening is positioned under said plunger; said end clamps and side clamps adapted to slip over the sides of said folded blank, while said composite plunger and blank is passing thru the opening in said slide, and hold said folded blank on said plunger, also means to support and to reciprocate said stripper rod, telescoping tubes and feed slide, and means to adjust said plunger and clips both vertically relatively to said operating means and about the common vertical axis.

30. In an automatic box machine the combination of a composite plunger comprising a lower stripper plunger, a middle plunger and a top plunger said stripper plunger carried on the lower end of a stripper rod said stripper rod telescoping into a middle tube provided on the lower end with the middle plunger, said middle tube telescoping into a top tube provided at the lower end with the top plunger; a side clamp tube telescoping over said top tube and provided at its lower end with side clamps, an end clamp tube telescoping over said side clamp tube and provided at its lower end with end clamps together with a feed slide provided with an opening and means to hold a blank centrally over said opening, said composite plunger adapted to act as a single plunger to fold said blank up about itself by driving said blank downwardly thru said opening when said opening is positioned under said plunger, said end clamps and side clamps adapted to slip over the sides of said folded blank, while said composite plunger and blank is passing thru the opening in said slide, and hold said folded blank on said plunger, also means to support and to reciprocate said stripper rod, telescoping tubes and feed slide, and means to adjust said plunger and clips both vertically relatively to said operating means and about the common vertical axis, and means to keep said plungers and clips in alignment during reciprocation.

31. In an automatic box machine the combination of a plurality of vertically reciprocable tubes telescoping into each other and over a central stripper rod with means to support and to reciprocate same; said stripper rod equipped at its lower end with a stripper plunger, one of said tubes with a middle plunger, another with a top plunger another with side clips and another with end clips together with a feed slide provided with an opening and means to retain a blank centrally over said opening, said plunger adapted to push said blank thru said slide folding said blank up into box form, said clips adapted to hold said folded blank about said plungers, said slide provided with a slot to allow the passage of said tubes, when said plungers are below said slide, and said slide is making its return stroke, with means to reciprocate said slide.

32. In an automatic box machine the combination of a plurality of vertically reciprocable tubes telescoping into each other and over a central stripper rod with means to support and to reciprocate same; said stripper rod equipped at its lower end with a stripper plunger, one of said tubes with a middle plunger, another with a top plunger, (said reciprocating means therefor provided with integral means adapted to either retard or advance the reciprocation of said top plunger relatively to said middle and stripper plungers), another with side clips and another with end clips together with a feed slide provided with an opening and means to retain a blank centrally over said opening, said plungers adapted to push said blank thru said slide folding said blank up into box form, said clips adapted to hold said folded blank about said plungers, said slide provided with a slot to allow the passage of said tubes, when said plungers are below said slide, and said slide is making its return stroke, with means to reciprocate said slide.

33. In an automatic box machine a device adapted to retard or advance the reciprocation of a plunger relatively to other plungers all operated from respective relatively fixed cam raceways comprising in combination, the cam, keyed to a shaft rotatably mounted in bearings on a supporting frame, a cam lever pivotally mounted on a pin carried in slots provided in said supporting frame, a cap screw, threaded thru each end of said pin, each provided with a lock nut, said screws passing thru supporting lugs on said frame and each held in position by a lock nut, together with a cam roller rotatably mounted on said lever and engaging a raceway of said cam, the end of said lever pivotally connected to a clamp on the tube provided for carrying and reciprocating said plunger.

34. In an automatic box machine the combination of the blank magazine, the blank extracting and conveying means, the feed slide, the cam operated plungers and clips, means to retard or advance the reciprocation of one plunger relatively to others operated from the same cam and relatively to the timing of the reciprocation of said feed slide.

35. In an automatic box machine the combination of opposite pairs of reciprocable end and side folders together with a plurality of reciprocable plungers operated from the same cam with means to advance or retard the reciprocation of one plunger relatively to the others and to the reciprocation of said end and side folders.

36. In an automatic box machine the combination of a composite plunger and clips; the feed slide provided with a blank folding opening, together with a rotary table adapted to position a label under said plunger and the blank folding opening provided in said slide.

37. In an automatic box machine the combination of a composite plunger and clips, the feed slide together with a rotary table, provided with a plurality of openings, adapted to retain a plurality of labels on said table, each, centrally, over its respective opening in said table and to position said labels, one at a time, under said plunger and the blank folding opening provided in said slide.

38. In an automatic box machine the combination of a composite plunger and clips, the feed slide; a rotary table, provided with a plurality of openings, adapted to retain a plurality of labels on said table, each, centrally, over its respective opening in said table and to position said labels, one at a time, under said plunger and the blank folding opening provided in said slide together with a sub plunger adapted to rise thru the said opening in said table, positioned under said composite plunger, to support the center of said label.

39. In an automatic box machine an adjustable sub-plunger and operating means comprising in combination the sub plunger carried on the upper end of a reciprocable rod, the lower end of said rod threaded; a nut, within a nut yoke, threaded on said lower end, said nut yoke slidable on said rod; a lock nut on said rod engaging the face of said nut yoke; a cam lever pivotally mounted, a cam roller rotatably mounted on said lever, and a cam, said roller running in a raceway provided in said cam, said lever pivotally connected to said nut yoke by links.

40. In an automatic box machine an adjustable sub-plunger and operating means comprising in combination the plunger carried on the upper end of a reciprocable rod, bearings for said rod, the lower end of said rod threaded; a nut, within a nut yoke, threaded on said lower end, said nut yoke slidable on said rod; a lock nut on said rod engaging the face of said nut yoke; a cam lever pivotally mounted, a cam roller rotatably mounted on said lever, and a cam, said roller running in a race way provided in said cam, said lever pivotally connected to said nut yoke by links, together with an arm adjustably mounted on said rod, above, and slidably engaging two lugs provided on said nut yoke; a guide rod depending from one of said bearings and slidably engaged in a slot provided in the end of said arm, adapted to prevent rotation of said sub-plunger and said nut yoke about their common vertical axis.

41. In an organized automatic box machine the combination of a composite plunger and clips; the feed slide; the rotary table adapted to retain a plurality of labels on said table, each, centrally, over its respective opening in said table and to position said labels, one at a time, under said plunger and the blank folding opening provided in said slide together with a sub plunger, with adjustable and nonrotative means adapted to rise thru the said opening in said table to support the center of said label also supporting and operating means for all of the foregoing.

42. In an organized automatic box machine the combination of a composite plunger and clips; the feed slide; the rotary table adapted to retain a plurality of labels on said table, each centrally, over its respective opening in said table and to position said labels, one at a time, under said plunger and the blank folding opening provided in said slide together with a sub-plunger, with adjustable and nonrotative means, adapted to rise thru the said opening in said table to support the center of said label, and side risers and end risers adapted to fold the sides of said label up against the side of a formed box blank, also supporting and operating means for all of the foregoing.

43. In an automatic box machine, corner folders, a device for folding the corner flaps of a label around the corners and against the ends of a formed blank each comprising in combination the supporting folder frame; slideways thereon; a reciprocable corner-folder slide provided with arms extending from opposite sides each pivotally carrying a flap folder; a folder yoke provided with a slot in each end slidably engaging and supported by a pin in its respective flap folder; a friction rod, threaded into said folder yoke, provided with a fixed collar, a head and a spring to maintain the setting of said rod; said rod slidably supported in a bearing, between said collar and said head, carried on said slide, together with a friction device, one on each side of said rod comprising a leather block, engaging said rod, said block carried in the head of a hollow push rod slidably supported in push rod bearings on said slideways; a spring within said push rod and adjusting screw in said push rod bearing engaging the end of said spring to adjust the pressure of said leather block against said friction rod.

44. In an automatic box machine, corner folders, a device for folding the corner flaps of a label around the corners and against the ends of a formed blank each comprising in combination the supporting folder frame; slideways thereon; a reciprocable corner-folder slide provided with a rack and with arms extending from opposite sides each pivotally carrying a flap folder, also an oscillating gear meshing with said rack adapted to reciprocate said slide; a folder yoke provided with a slot in each end slidably engaging and supported by a pin in its respective flap folder; a friction rod, threaded into said folder yoke, provided with a fixed collar, a head and a spring to maintain the setting of said rod; said rod slidably supported in a bearing, between said collar and said head, carried on said slide, together with a friction device, one on each side of said rod comprising a leather block, engaging said rod, said block carried in the head of a hollow push rod slidably supported in push rod bearings on said slideways; a spring within said push rod and an adjusting screw in said push rod bearing engaging the end of said spring to adjust the pressure of said leather block against said friction rod.

45. In an automatic box machine the combination of opposite corner flap folders each equipped with a rack, as described, together with mechanism for operating same comprising, two folder shafts carried in bearings on said folder frame, a gear keyed to each folder shaft meshing with its respective rack; a connecting shaft mounted in bearings on said folder frame with a mitre gear keyed to each end, each of said mitre gears meshing with a corresponding mitre gear keyed to the end of the adjacent folder shaft; a segment of a gear keyed to the end of one folder shaft; a rack rod meshed with said segmental gear and means to keep said rack meshed with said segmental gear; a cam and a cam lever pivotally mounted provided with a cam roller pivotally mounted, running in a raceway in said cam, said cam lever pivotally connected to said rack rod thru a rod end threaded onto said rack rod.

46. In an automatic box machine, corner folders, a device for folding the corner flaps of a label around the corners and against the ends of a formed blank, each comprising in combination the supporting folder frame, slideways thereon, a corner folder slide, with means to reciprocate same, said slide provided with arms extending from opposite sides each pivotally carrying a flap folder; a folder yoke provided with a slot in each end slidably engaging and supported by a pin in its respective flap folder; a friction rod, threaded into said folder yoke, provided with a fixed collar, a head and a spring to maintain the setting of said rod; said rod slidably supported in a bearing, between said collar and said head, carried on said slide, together with a friction device, one on each side of said rod comprising a leather block carried in the head of a hollow push rod slidably supported in push rod bearings on said slideways; a spring within said push rod and an adjusting screw in said push rod bearing engaging the end of said spring to adjust the pressure of said leather block against said friction rod.

47. In an automatic box machine side and end folders adapted to turn the edges of a label inwardly over the top edges of a formed box, each comprising in combination the supporting folder frame; slideways thereon; a folder slide, provided with a rectangular opening, reciprocable in said slideways; a slide centre, provided with a rack fitting into said opening in said slide adjustable relatively to the end of said slide by retaining and locking screws.

48. In an automatic box machine a rotary table provided with openings, a sub-plunger adapted to rise through one of said openings and support a formed box partially covered by a label, together with two opposite side folders and two opposite end folders, adapted to turn the edges of said label inwardly over the top edges of said formed box, each comprising in combination a reciprocable slide, slidably mounted in slideways mounted on a supporting frame.

49. In an automatic box machine two opposite side folders adapted to turn the edges of a label inwardly over the side top edges of a formed box with means to operate same comprising in combination, two reciprocable side slides, each provided with a rectangular opening and slidably supported in slideways carried on a folder frame; a slide centre, provided with a rack, fitting into said opening in said slide, adjustable relatively to the end of said slide by retaining and locking screws; each slide reciprocated by a gear keyed to a side folder shaft and meshing with said rack; both side folder shafts connected for simultaneous operation by a shaft, supported in bearings provided on said folder frame; a mitre gear keyed to each end of said shaft each mitre gear meshing with a mitre gear keyed to the end of one of said side folder shafts; a segment of a gear keyed to the end of one of said side folder shafts; a rack rod meshed with said segmental gear and means to keep said rack meshed with said segmental gear; a cam and a cam lever pivotally mounted provided with a cam roller rotatably mounted, running in a raceway in said cam, said cam lever pivotally connected to said rack rod thru a rod end threaded onto said rack rod.

50. In an automatic box machine two opposite end folders adapted to turn the edges of a label inwardly over the end top edges of a formed box with means to operate same comprising in combination, two reciprocable end slides, each provided with a rectangular opening and slidably supported in slideways carried on a folder frame; a slide centre, provided with a rack, fitting into said opening in said slide, adjustable relatively to the end of said slide by retaining and locking screws; each slide reciprocated by a gear keyed to a side folder shaft and meshing with said rack; both end folder shafts connected for simultaneous operation by a shaft, supported in bearings provided on said folder frame; a mitre gear keyed to each end of said shaft each mitre gear meshing with a mitre gear keyed to the end of one of said end folder shafts; a segment of a gear keyed to the end of said connecting shaft; a rack rod meshed with said segmental gear and means to keep said rack meshed with said segmental gear; a cam and a cam lever pivotally mounted provided with a cam roller rotatably mounted, running in a race-way in said cam, said cam lever pivotally connected to said rack thru a rod end threaded onto said rack rod.

51. In an automatic box machine the combination of a pair of opposed corner folding devices adapted to fold the corner flaps of a label around the corners of a formed blank; a pair of opposed side folder devices adapted to turn the edges of a label inwardly over the top side edges of a formed box and a pair of end folder devices adapted to turn the edges of a label inwardly over the top end edges of a formed box with supporting and operating means, all substantially as shown and described.

52. In an automatic box machine the combination of the composite plunger and clips, the feed slide, the rotary table with suction platens, the subplunger and risers together with a pair of opposed corner folding devices, a pair of opposed side folder devices and a pair of end folder devices with supporting and operating means.

53. In an automatic box machine the combination of the vertically reciprocable subplunger and the side and end risers adapted to form a rigid mould together with a composite plunger adapted to make a finished box conform to said mould.

54. In an automatic box machine the combination of the subplunger; the side and end risers; the composite plunger and the side and end folders; the said plunger adapted to support a covered box within said side and end risers, the side and end folders adapted to press said risers against said box to insure firm adhesion of the turned in edges of said box covering to the inside of said box.

55. In an automatic box machine the combination of the subplunger; the side and end risers; the composite plunger and the side and end folders; the said plunger adapted to support a covered box within said side and end risers, the side and end folders adapted to press said risers against said box to insure firm adhesion of the turned in edges of said box covering to the inside of said box, with means to support and to operate the foregoing.

56. In an automatic box machine the combination of the composite plunger, the feed slide, the rotary table with suction platens, the sub-plunger and risers together with corner flap folders and side and end folders between said slide and said rotary table with means to support and to operate the foregoing, all adapted to operate in sequence to feed a blank and a label and fold same up into box form.

57. In an organized automatic box machine the combination of the blank magazine; the blank extracting and conveying means; the feed slide; the label magazine; the label extracting and conveying means; the adhesive applying device; the rotary table with suction platens; the composite plunger and clips; the sub-plunger and risers together with the corner flap folding and side and end folding devices with means to support and to operate all of the foregoing, all adapted to operate in sequence to feed a blank and a label, glue said label and to assemble and fold same up into a finished box.

58. In an organized automatic box machine the combination of a composite plunger and clips; the feed slide; the adhesive applying device, the rotary table adapted to retain a plurality of labels on said table, each, centrally, over its respective opening in said table and to position said labels, one at a time under said plunger and the blank folding opening provided in said slide together with a sub-plunger, with adjustable and non-rotative means, adapted to rise thru the said opening in said table to support the centre of said label and side end risers adapted to fold the sides of said label up against the sides of a formed box blank, also supporting and operating means for all of the foregoing.

59. In an automatic box machine a yoke, a pair of side risers and a pair of end risers, each pair loosely riveted at their lower ends to the vertical arms of said yoke, set screws in the upper part of said arms adapted to adjust the fixed distance between the inner opposed faces of said side risers or said end risers.

60. In an automatic box machine the method of applying adhesive to the surface of a label, held on a platen by air suction, consisting in rolling the said adhesive onto said label; first, starting at the central portion and rolling on the coating to one edge, and then, again starting from said central portion, and rolling on the remainder of the coating to the opposite edge.

61. In an automatic box machine the method of applying adhesive to the surface of a label, held on a platen, consisting in rolling the said adhesive onto said label first starting at the central portion and rolling on the coating to one edge and then again starting from said central portion and rolling on the remainder of the coating to the opposite edge.

62. In an organized automatic box machine the combination of the label magazine; the label extracting and conveying means; the adhesive applying device and the rotary table provided with suction platens all adapted to operate in sequence to feed and position a glued label under a plunger.

63. In an organized automatic box machine the combination of the blank magazine; the blank extracting and conveying means; the feed slide; the label magazine; the label extracting and conveying means; the adhesive applying device and the rotary table provided with suction platens, all adapted to operate in sequence to feed and position a blank under a plunger, and to simultaneously feed and position a glued label below said positioned blank and under said plunger.

64. In an organized automatic box machine the combination of a plunger; rotary means to position a glued label under said plunger; slide means to position a blank under said plunger and over said glued label, with means operating between said slide means and said rotary means to complete the wrapping of said glued label about said blank after said blank has been folded up about said plunger.

65. In an organized automatic box machine the combination of a plunger; rotary means to position a glued label under said plunger; slide means to position a blank under said plunger and over said glued label together with means to complete the wrapping of said glued label about said blank after said blank has been folded up into box form and while said blank in said box form is between said rotary means and said slide means.

66. In an organized automatic box machine the combination of a blank magazine; a blank extracting and conveying means; a feed slide; a label magazine; a label extracting and conveying means; an adhesive applying device and a rotary table provided with suction platens, all adapted to operate in sequence to feed and position a blank under a plunger, and to simultaneously feed and position a glued label below said positioned blank and under said plunger,—said feed slide and said rotary table and platens each provided with openings to allow said plunger to pass through said feed slide and said rotary table and one platen at a time when said respective openings are in line.

67. In an organized automatic box machine the combination of a plunger, slide means to position a blank under said plunger; rotary means to position a glued label under said blank together with means to complete the wrapping of said glued label about said blank after said blank has been folded up about said plunger.

68. In an organized automatic box machine the combination of a plunger, slide means to position a blank under said plunger; means to position a glued label under said blank; said label positioning and blank positioning means provided with openings to allow said plunger to pass through them, when said openings are in line, together with means to complete the wrapping of said glued label about said blank after said blank has been folded up about said plunger.

Signed at Whitestone, in the county of Queens and State of New York, this twenty-first day of October A. D. 1925.

ROBERT H. FENN.